United States Patent [19]

Murashita et al.

[11] Patent Number: 5,313,948
[45] Date of Patent: May 24, 1994

[54] ULTRASONIC DIAGNOSTIC APPARATUS

[75] Inventors: Masaru Murashita; Toshiyuki Matsunaka, both of Mitaka, Japan

[73] Assignee: Aloka Co., Ltd., Japan

[21] Appl. No.: 982,304

[22] Filed: Nov. 25, 1992

[30] Foreign Application Priority Data

| Nov. 28, 1991 | [JP] | Japan | 3-314942 |
| Mar. 9, 1992 | [JP] | Japan | 4-050503 |
| Sep. 29, 1992 | [JP] | Japan | 4-259446 |
| Sep. 29, 1992 | [JP] | Japan | 4-259447 |

[51] Int. Cl.⁵ .................................... A61B 8/13
[52] U.S. Cl. .................. 128/662.02; 128/662.07
[58] Field of Search ............ 128/660.01, 660.05, 128/660.07, 661.01, 662.02; 364/421

[56] References Cited

U.S. PATENT DOCUMENTS

| 4,106,346 | 8/1978 | Matzak | 128/660.07 |
| 4,257,270 | 3/1981 | Walz et al. | 128/660.01 |
| 4,662,380 | 5/1987 | Riley | 128/660.07 |
| 5,083,566 | 1/1992 | Baba | 128/660.05 |
| 5,191,557 | 3/1993 | Rector et al. | 364/421 |

FOREIGN PATENT DOCUMENTS

| 0220631 | 5/1987 | European Pat. Off. | G01S 7/52 |
| 0487384 | 5/1992 | European Pat. Off. | G06F 15/68 |

OTHER PUBLICATIONS

Melton Jr., et al., Rational-Gain-Compensation for Attenuation in Ultrasonic Cardiac Imaging, Ultrasonics Symposium Proceedings, IEEE, vol. 2, Oct. 14, 1981, pp. 607–611.

*Primary Examiner*—William E. Kamm
*Assistant Examiner*—George Manuel
*Attorney, Agent, or Firm*—Marger, Johnson, McCollom & Stolowitz

[57] ABSTRACT

An ultrasonic diagnostic apparatus comprises an ultrasonic transducer for transmitting and receiving ultrasonic waves to and from a body to be examined and a control section for automatically determining the optimum image conditions on the basis of the echo signals obtained by the ultrasonic transducer. The control section comprises circuits for controlling the amplification factor of the echo signals, the amplification factors of the echo signals for the respective visual field depths and the adjustment of image contrast, on the basis of the echo signals obtained by the ultrasonic transducer. These control circuits comprises a histogram forming circuit for forming histogram information on the basis of the echo signals obtained by ultrasonic transducer, which represents a histogram in which the brightness values of the image to be displayed as gradations and the number of pixels of the respective corresponding brightness values as frequencies; a compared value detecting circuit for detecting a median value or a peak value of the formed histogram on the basis of the histogram information; and an amplification factor determining circuit for comparing the compared value with a predetermined reference value and for determining the amplification factor of the echo signals or the adjustment level of the image contrast so as to eliminate the difference between the compared value and the reference value. The ultrasonic diagnostic apparatus can automatically determine the optimum image conditions at all times, irrespective of the thickness of the layer of fat or the state of the tissue of the body to be examined.

36 Claims, 10 Drawing Sheets

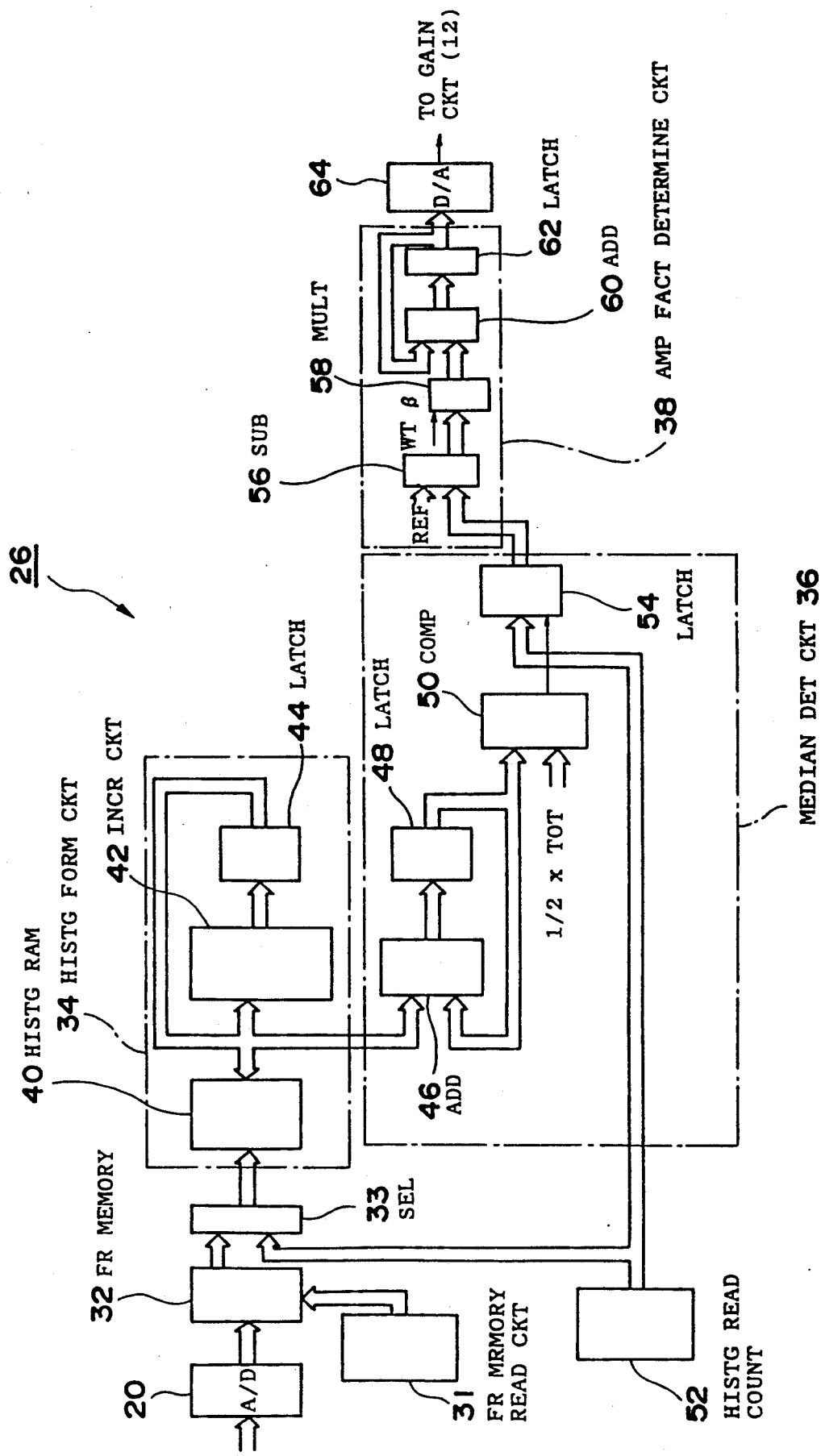

(A)

(B)

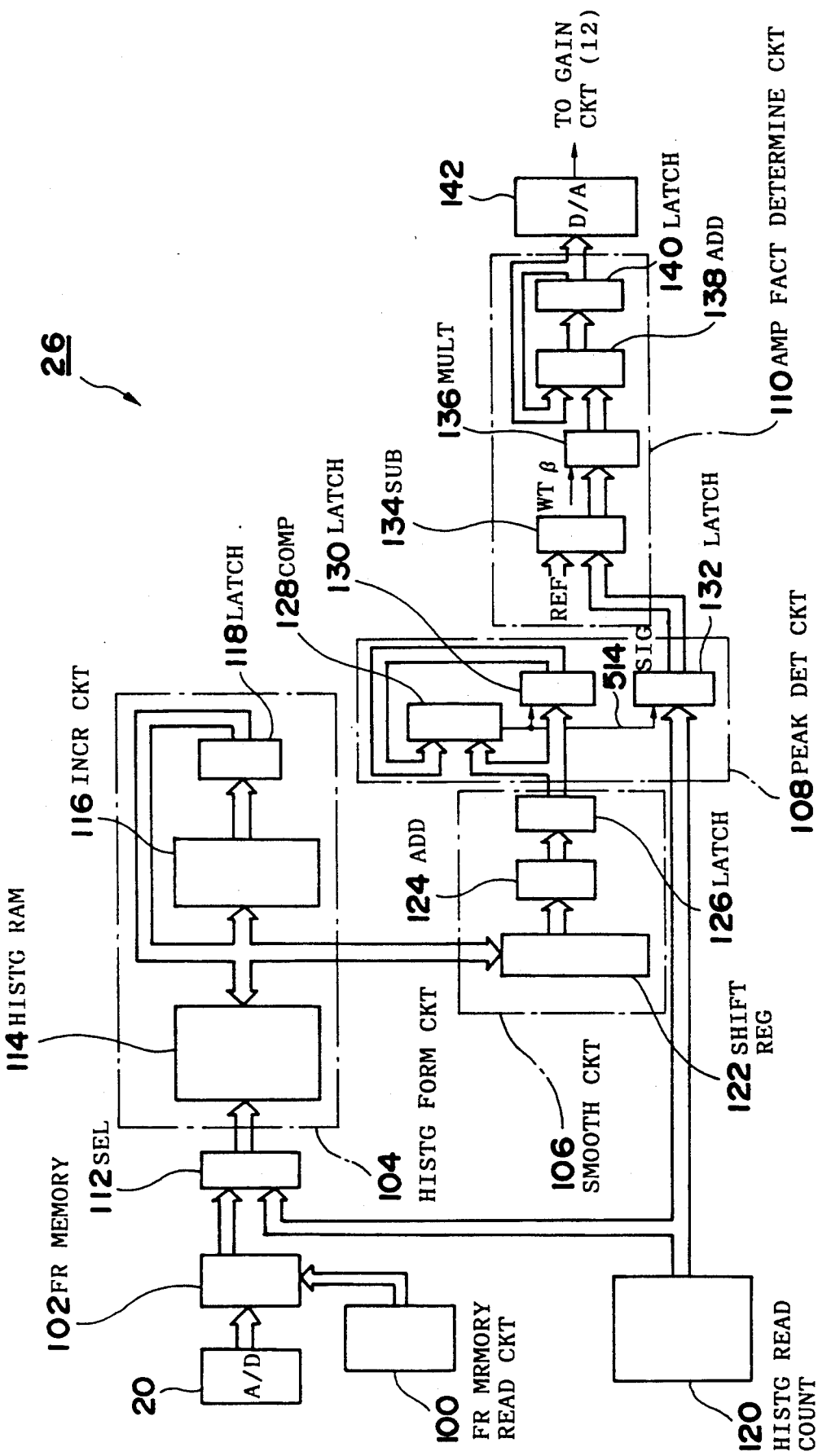

ULTRASONIC DIAGNOSTIC APPARATUS

BACKGROUND OF THE INVENTION

1. Field of the Invention

The present invention relates to an ultrasonic diagnostic apparatus, and more specifically to an ultrasonic diagnostic apparatus which can automatically determine the optimum image conditions such as brightness, contrast, etc.

2. Description of the Prior Art

The ultrasonic diagnostic apparatus transmits ultrasonic waves to a living body, receives echoes reflected from the inside of the living body, converts the received echoes to analog echo signals, and displays an image (e.g. tomographic image) on a display unit (e.g. CRT) based on the echo signals.

The ultrasonic waves are transmitted and received from and by an ultrasonic transducer (probe). In this case, the echoes received by the ultrasonic transducer are extremely weak. Therefore, in order to clearly display a tomographic image on the CRT based on the echo signals, it is necessary to amplify the echo signals through a few amplifier circuits. Further, when the tomographic image is displayed on the CRT, it is important to adjust the contrast of the image. Accordingly, the adjustments for the amplification level of the echo signals and the contrast of the displayed image are essential factors to determine the quality of the image of the ultrasonic diagnostic apparatus.

FIG. 1 shows an echo signal amplifier circuit of the prior art ultrasonic diagnostic apparatus. In the drawing, analog echo signals fed from an ultrasonic transducer 1 are first inputted to a gain circuit 2. The echo signals are amplified by the gain circuit 2. The amplification factor of the gain circuit 2 is determined in response to a gain signal 500 whose level can be adjusted by a dial which is rotatable manually.

The amplified echo signals are then inputted to a STC (sensitivity time control) circuit 4. This STC circuit 4 amplifies the echo signals on the basis of respective different amplification factors determined according to the respective visual field depths in the ultrasonic beam direction. In other words, STC signals 502 which are applied to the STC circuit 4 are determined for each visual field depth, so that the amplification level of the echo signals are adjusted for each visual field depth according to the level of each STC signal 502.

In the prior art ultrasonic diagnostic apparatus, however, a plurality of sliders (e.g. 16 sliders) are arranged on a control panel, so that the levels of the STC signals 502 can be adjusted manually by operating the sliders. Therefore, it has been performed to selectively increase the brightness of only the image obtained at a specific depth (from which a weak echo is received), for instance. The echo signals from the STC circuit 4 are then fed to a logarithmic amplifier 5 and amplified logarithmically, that is to say, low level signals therein are mainly amplified.

Successively, the echo signals from the logarithmic amplifier 5 are inputted to a contrast circuit 6. This contrast circuit 6 adjusts the image contrast of the echo signals according to a contrast signal 504 inputted thereto. Here, when the brightness levels of the respective pixels (picture elements) on a single image obtained on the basis of the echo signals are arranged in a histogram fashion, it is possible to adjust the slope of the obtained histogram sharply or gently, by adjusting the level of the contrast signal 504. In practice, when the slope of the convex portion of the histogram is made sharp, the image becomes dim since this indicates that the brightness levels of the respective pixels concentrate, relatively. On the other hand, when the slope of the convex portion of the histogram is made flat, the image becomes strong in light and shade since this indicates that the brightness levels of the respective pixels scatter, relatively. In the prior art ultrasonic diagnostic apparatus, the image contrast is adjusted by adjusting the level of the contrast signal 504 by operating a dial provided on the control panel manually.

The echo signals 506 outputted from the contrast circuit 6 are applied to an A/D converter 7, so that the applied echo signals 506 are converted into digital signals through the A/D converter 7. The converted digital signals 508 are transmitted to a frame memory 8, and then converted into analog signals and displayed on a monitor 9 (e.g. CRT).

In the prior art ultrasonic diagnostic apparatus as described above, in order to manually obtain an ultrasonic image under the optimum image conditions (e.g. with respect to brightness and contrast), it is necessary to adjust the levels of the gain signal 500, the STC signal 502 for each visual field depth, and the contrast signal 504. However, since these adjustment levels of these signals 500, 502, 504 are different according to various conditions such as the part of a living body, the thickness of the layer of body fat, the figure of the body, etc. the adjustments of the levels are very delicate and fine. Therefore, there exists a problem in that the operator must rotate the dials in trial and error fashion repeatedly and therefore the adjustment operation is complicated. In addition, when the gains of a plurality of visual field depth areas are required to be adjusted, there exists a further problem in that the manual adjustment operation requires further long time because the balance between the mutual brightness levels in the respective visual field depth areas is also required. Further, in the ultrasonic diagnostic apparatus, in particular the image quality and visibility exert a serious influence upon the precision in disease diagnosis, and additionally it is extremely desirable to diagnose a part of a patient in a time as short as possible in the case of the ultrasonic diagnosis during an operation. In other words, there exists a need of an ultrasonic diagnostic apparatus which can provide the optimum images under the best image conditions automatically and momentarily.

SUMMARY OF THE INVENTION

With these problems involved in the prior art ultrasonic diagnostic apparatus in mind, therefore, it is the primary object of the present invention to provide an ultrasonic diagnostic apparatus which can automatically obtain the various optimum image conditions in relation to the amplification factor of the gain signal, the STC level of the respective visual field depths and the contrast level of the image.

To achieve the above-mentioned object, an ultrasonic diagnostic apparatus according to the present invention comprises: an ultrasonic transducer for transmitting and receiving ultrasonic waves to and from a body to be examined; and control means for automatically determining the optimum image conditions on the basis of echo signals obtained by said ultrasonic transducer based on the received ultrasonic waves.

In the above-mentioned ultrasonic diagnostic apparatus according to the present invention, it is possible to always determine the optimum image conditions automatically, irrespective of the various conditions of the body to be examined such as the thickness of the layer of fat and the state of the tissue of a patient, so that it is possible to improve the visibility and the manipulatability of the ultrasonic diagnostic apparatus.

The control means for automatically determining the optimum image conditions comprises: histogram forming means for forming histogram information on the basis of the echo signals obtained by said ultrasonic transducer, in which a histogram represented by the histogram information being formed by taking brightness values of image to be displayed on an abscissa as gradations and taking the numbers of pixels having the respective corresponding brightness values on an ordinate as frequencies; and echo signal control means for comparing a value obtained on the basis of the histogram information with a predetermined reference value corresponding to the optimum image and for controlling the echo signals so as to eliminate the difference between the compared value and the reference value.

The ultrasonic diagnostic apparatus further comprises: echo signal amplifying means for amplifying the echo signals obtained by said ultrasonic transducer; and said control means for automatically determining the optimum image conditions comprises echo signal amplification factor control means for automatically controlling an amplification factor of said echo signal amplifying means on the basis of the echo signals obtained by said ultrasonic transducer.

The echo signal amplification factor control means preferably comprises: histogram forming means for forming histogram information based on the echo signals obtained by said ultrasonic transducer, in which a histogram represented by the histogram information being formed by taking brightness values of an image to be displayed on an abscissa as gradations and taking the numbers of pixels having the respective corresponding brightness values on an ordinate as frequencies; compared value detecting means for detecting a compared value on the basis of the histogram information; and amplification factor determining means for comparing the compared value obtained by said compared value detecting means with a predetermined reference value and for determining the echo signal amplification factor so as to eliminate the difference between the compared value and the reference value, wherein the echo signals being amplified by said echo signal amplifying means on the basis of the determined echo signal amplification factor.

Further, the compared value detecting means preferably comprises means for detecting a brightness value in the gradations to which a median value of the histogram represented from the histogram information belongs on the basis of the histogram information or means for detecting a brightness value in the gradations to which a peak value of the histogram represented from the histogram information belongs on the basis of the histogram information.

As described above, when a histogram is formed for the ultrasonic image on the basis of the echo signals in such a way that the brightness values of the image to be displayed are taken on the abscissa and the numbers of pixels having the respective corresponding brightness values are taken on the ordinate, the experiments indicate that the formed histogram has Gaussian distribution. The fact that the Gaussian distribution can be obtained when the histograms of the ultrasonic images are formed is a particular phenomenon of the ultrasonic image based upon a property of the ultrasonic waves. The Gaussian distribution can be obtained whenever the histograms of the ultrasonic images are formed, irrespective of the brighter or darker image, in which the Gaussian distribution in the histogram appears such that both the sides of the convex portion of the histogram extend downward gradually.

On the other hand, the experiments indicate that the image most easy to see, that is the optimum image forms such a histogram that the central gradation value is about 80 when the brightness levels are divided into the gradation values of 255 according to 8-bit data. Therefore, in the present invention, the reference value of the image most easy to see is set to 80 in the above-mentioned histogram. However, since the optimum condition of the image most easy to see differs between individuals, it is preferable to configure the control means so that the reference value can be determined freely.

In the present invention, the brightness value of gradations to which a median value or a peak value of the histogram belongs is obtained on the basis of the histogram information, and the obtained value is compared with the reference value of 80. Further, the amplification factor of the amplifying means for amplifying the echo signals is so controlled as to eliminate the difference between the compared value and the reference value. As a result, it becomes possible to display the ultrasonic image under the optimum brightness condition automatically at all times.

Further, the ultrasonic diagnostic apparatus further comprises: individual echo signal amplifying means for amplifying an echo signal individually for each visual field depth on the basis of the echo signals obtained by said ultrasonic transducer; and said control means for automatically determining the optimum image conditions comprises individual echo signal amplification factor control means for automatically controlling amplification factors of said individual echo signal amplifying means for the respective visual field depths in an ultrasonic beam direction on the basis of the echo signals obtained by said ultrasonic transducer.

The individual echo signal amplification factor control means preferably comprises: means for extracting a plurality of reference areas including echo signals at the respective visual field depths in the ultrasonic beam direction on the basis of the echo signals obtained by said ultrasonic transducer; histogram forming means for forming histogram information on the basis of the echo signal in each of the extracted reference areas, in which a histogram represented by the histogram information being formed by taking brightness values of an image to be displayed on an abscissa as gradations and taking the numbers of pixels having the respective corresponding brightness values on an ordinate as frequencies; compared value detecting means for detecting compared values on the basis of the histogram information; and amplification factor determining means for comparing the compared values obtained by said compared value detecting means with predetermined reference values and for determining the echo signal amplification factors so as to eliminate the differences between each of the compared values and the reference value, respectively, wherein the echo signals for the respective visual field depths being amplified by said individual echo signal amplifying means on the basis of the determined echo signal amplification factors.

Further, the compared value detecting means comprises means for obtaining a brightness value of gradations to which a peak value of the histogram belongs on the basis of the histogram information.

In the above-mentioned configuration, it is possible to appropriately control the amplification factor of the echo signals for each visual field depth of the ultrasonic image, so that the ultrasonic images can be displayed under the optimum brightness condition automatically at all times.

Further, the ultrasonic diagnostic apparatus comprises contrast adjusting means for adjusting contrast level of an image to be displayed on the basis of the echo signals obtained by said ultrasonic transducer; and said control means for automatically determining the optimum image conditions comprises contrast control means for automatically controlling the contrast level adjusted by said contrast adjusting means on the basis of the echo signals obtained by said ultrasonic transducer.

The contrast control means comprises: histogram forming means for forming histogram information on the basis of the echo signals obtained by said ultrasonic transducer, in which a histogram represented by the histogram information being formed by taking brightness values of image to be displayed on an abscissa as gradations and taking the numbers of pixels having the respective corresponding brightness values on an ordinate as frequencies; compared value detecting means for detecting a compared value on the basis of the histogram information; and contrast level determining means for comparing the compared value obtained by said compared value detecting means with a predetermined reference value and for determining the contrast adjustment level so as to eliminate the difference between the compared value and the reference value, wherein the contrast level being adjusted by amplifying the echo signals through said contrast adjusting means on the basis of the determined contrast adjustment level. Further, the compared value detecting means comprises means for detecting a predetermined width value at a predetermined height of the histogram on the basis of the histogram information.

In the configuration as described above, it is possible to control the image contrast automatically, so that the ultrasonic image can be displayed under the optimum contrast condition automatically at all times.

The other objects, the configurations and the advantages of the present invention will be apparent from the following description with reference to the attached drawings.

BRIEF DESCRIPTION OF THE DRAWINGS

FIG. 3 is a block diagram showing a first embodiment of a gain control section of the ultrasonic diagnostic apparatus according to the present invention;

FIG. 5 is a block diagram showing a second embodiment of the gain control section of the ultrasonic diagnostic apparatus according to the present invention;

DETAILED DESCRIPTION OF THE PREFERRED EMBODIMENTS

The preferred embodiments of the ultrasonic diagnostic apparatus according to the present invention will be described hereinbelow with reference to the attached drawings.

Figure 1:
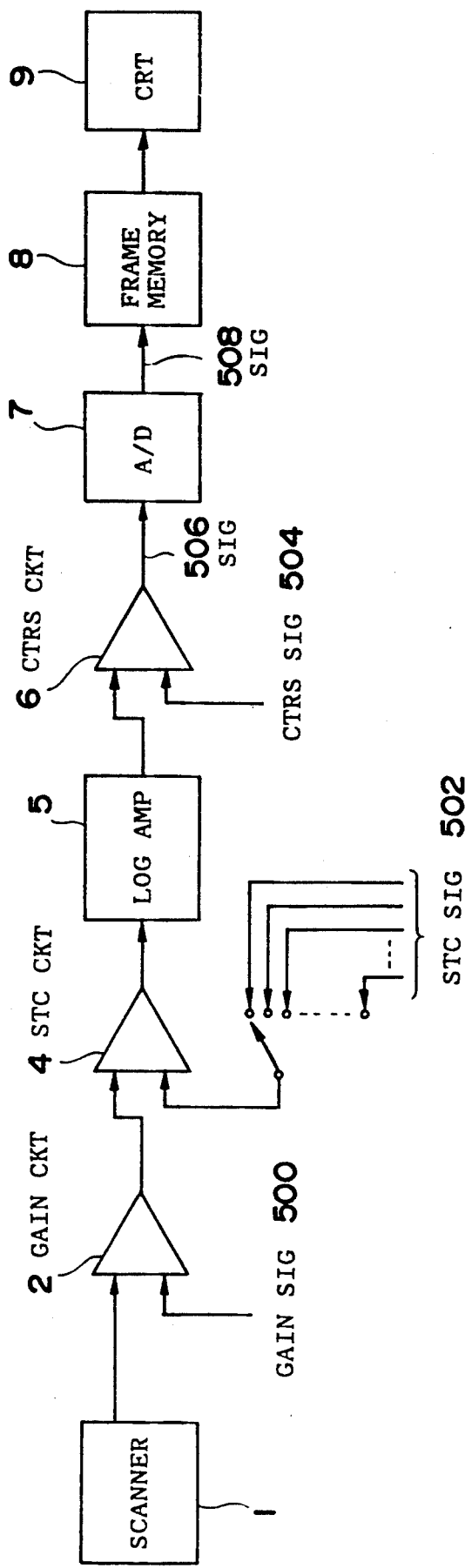
FIG. 1 is a block diagram showing a configuration of an amplifier circuit of a prior art ultrasonic diagnostic apparatus.
Figure 2:
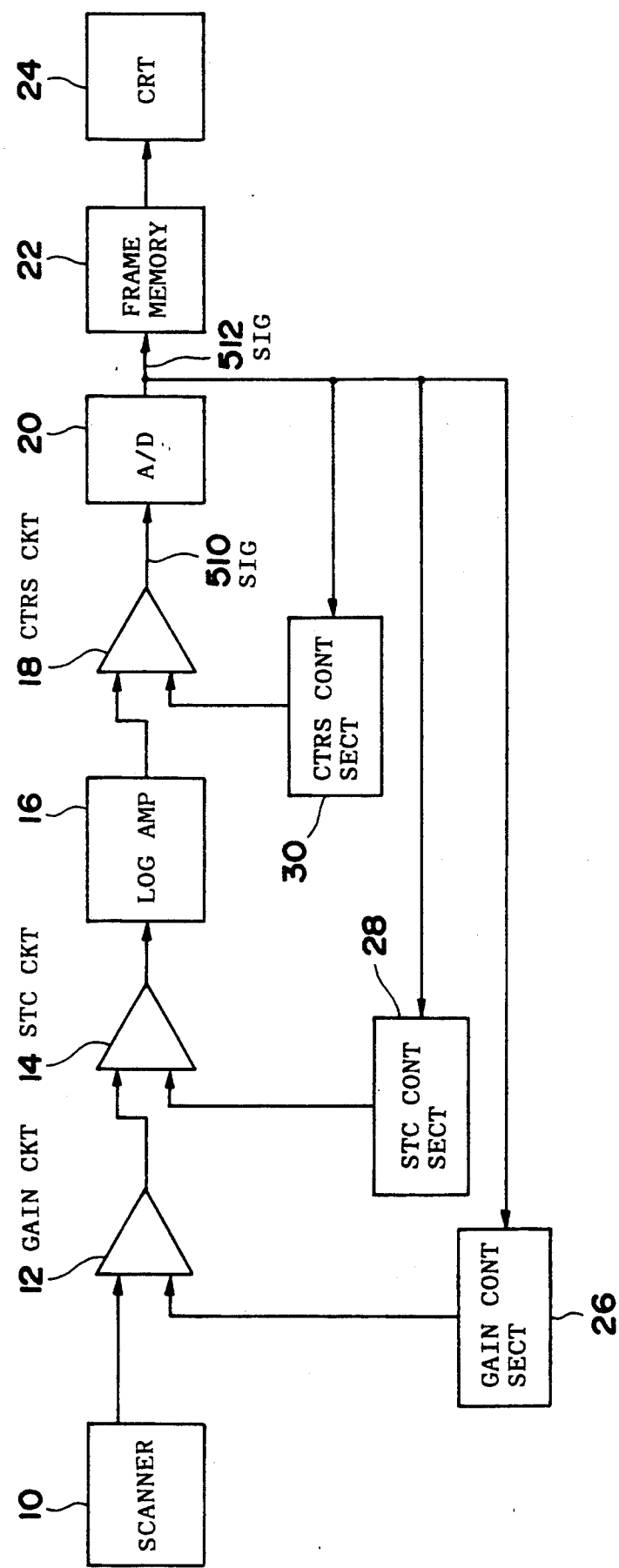
FIG. 2 is a block diagram showing a configuration of an amplifier circuit having control circuits of the ultrasonic diagnostic apparatus according to the present invention.

FIG. 2 is a block diagram showing the entire general configuration of the embodiment of the ultrasonic diagnostic apparatus according to the present invention.

In the drawing, analog echo signals supplied from an ultrasonic transducer 10 are applied to a gain circuit 12. The gain circuit 12 amplifies the echo signals uniformly, irrespective of the visual field depths. The echo signals amplified by the gain circuit 12 are then transmitted to a STC (sensitivity time control) circuit 14. This STC circuit 14 amplifies the echo signals on the basis of the respective different amplification factors determined according to the respective visual field depths in the direction of ultrasonic beam. The echo signals amplified by the STC circuit 14 are fed to a logarithmic amplifier 16. In this logarithmic amplifier 16, the signals amplified by the STC circuit 14 are further amplified logarithmically in such a way that the low level signal therein is amplified mainly.

Subsequently, the echo signals amplified by the logarithmic amplifier 16 are inputted to a contrast circuit 18. This contrast circuit 18 adjusts the contrast of the image to be displayed on a monitor on the basis of the echo signals. Here, when the brightness levels of the respective pixels on a single image obtained on the basis of the echo signals are represented in a histogram fashion by taking the brightness levels on the abscissa and by taking the frequencies (the number of times) of the pixels having the respective corresponding brightness levels on the ordinate, it is possible to adjust the slope of the convex portion of the obtained histogram sharply or gently by adjusting the contrast circuit 18. In practice, when the slope of the histogram is made sharp in shape, the visual image becomes dim since this means that the brightness levels of the respective pixels concentrate. On the other hand, when the slop of the histogram is made flat, the visual image becomes strong in light and shade since this means that the brightness levels of the respective pixels scatter.

The echo signals 510 outputted from the contrast circuit 18 are then applied to an A/D converter 20. This A/D converter 20 converts the applied echo signals 510 into digital signals. The converted digital signals 512 are fed to the monitor (e.g. CRT) 24 through a frame memory 22 which constitutes a digital scanning converter (DSC), so that the echo signals are displayed on the monitor as a visual image after being D/A converted. In addition, the converted signals 512 are also fed to a gain control section 26, a STC control section 28, and a contrast control section 30, respectively. These control sections 26, 28 and 30 control the gain circuit 12, the STC circuit 14 and the contrast circuit 18, respectively in feedback manner on the basis of the output signals 512 from the A/D converter 20.

Here, the A/D converter 20 converts the analog echo signals 510 into digital signals 512 so as to correspond to the brightness gradations of the image to be displayed on the monitor (CRT) 24. For example, when the A/D converter 20 of 8-bit quantization is used, the digital data is composed of 8 bits. That is, the brightness gradations are $2^8 = 256$. In the present embodiments, although the 8-bit converter 20 is used by way of example hereinbelow, it is of course possible to adopt an A/D converter of 6-bits or others.

With reference to FIG. 3, an embodiment of the gain control section 26 will be described in detail hereinbelow. The gain control section 26 automatically controls in feed back manner the amplification factor of the gain circuit 12 on the basis of the echo signals obtained by the ultrasonic transducer 10.

As shown in FIG. 3, the gain control section 26 of the present embodiment comprises a frame memory 32 for storing data for one image frame on the basis of the echo signals obtained by the ultrasonic transducer 10, a histogram forming circuit 34 for forming histogram information on the basis of the data stored in the frame memory 32, the histogram information representing a histogram in which the brightness values of pixels of the frame memory 32 are taken as gradations on an abscissa and the numbers of times of the pixels having the respective corresponding brightness values are taken as the frequencies of the pixels on an ordinate, a median value detecting circuit 36 for detecting a median brightness value of the formed histogram on the basis of the histogram information, and an amplification factor determining circuit 38 for comparing the detected median brightness value (the brightness value of gradations to which the median value of the formed histogram belongs) obtained by the median value detecting circuit 36 with a predetermined reference value and for determining an amplification factor so that the difference between the compared value and the reference value can be minimized.

Specifically, the frame memory 32 stores the image data in the unit of one frame (one picture) to be displayed on the monitor 24. In this embodiment, the frame memory 32 is provided with memory cells corresponding to 128×512 pixels. In the respective memory cells, the brightness values of the image are stored as 8-bit quantization data pixel by pixel. A frame memory reading circuit 31 for extracting echo data within a reference area (described later with reference to FIG. 6) is connected to the frame memory 32, to supply address signals to the frame memory 32. In order to form the histogram information, the 8-bit data corresponding to the respective pixels within the reference area are read out one by one from the frame memory 32, and the read data are fed to the histogram forming circuit 34 through a selector 33.

The histogram forming circuit 34 is provided with a histogram RAM 40, an increment circuit 42, and a latch circuit 44 so as to form the histogram information. The histogram information formed in this histogram forming circuit 34 corresponds to the histogram in which the brightness values of the image to be displayed are arranged on the abscissa as gradations and the numbers of times of the pixels having the respective corresponding brightness values are arranged on the ordinate as the frequencies as described above.

In more detail, the histogram RAM 40 includes at least 256 memory locations according to the brightness gradients. The addresses of the histogram RAM 40 (at which the data are written in correspondence to the brightness values of the respective pixels) are designated in accordance with the digital signals supplied from the frame memory 32. The increment circuit 42 increments by one the numerical data corresponding to the number of pixels stored in each of the addresses of the histogram RAM 40, whenever the same data is written into the address additionally. The latch circuit 44 latches the numerical data incremented by the increment circuit 42, and stores the latched data again at the same address of the histogram RAM 40. When the above-mentioned processing is executed for all the data stored in the frame memory 32, it is possible to form the above-mentioned histogram information in the histogram RAM 40. Namely, in the histogram RAM 40, there is produced the histogram information which represents the histogram in which the brightness values of the image to be displayed are taken on the abscissa as gradations and the numbers of the pixels having the respective corresponding brightness values are taken on the ordinate as frequencies.

After the histogram information has been produced, the selector 33 selects the connection to a histogram reading counter 52, so that the count signal outputted from the histogram reading counter 52 is supplied to the histogram RAM 40 through the selector 33, to read out the data which indicates frequency (the number of the pixels) stored at the designated address and transmit it to a median value detecting circuit 36.

The median value detecting circuit 36 is provided with an adder 46, a latch circuit 48, a comparator 50 and a latch circuit 54. The adder 46 adds the frequency read out from the histogram RAM 40 to the value latched by the latch circuit 44. The latch circuit 48 latches the added result. The comparator 50 compares the value latched by the latch circuit 48 with a predetermined value, and outputs a signal when both match to each other. This predetermined value is a half of the total number of the pixels. The brightness value obtained at this time is the brightness value of the gradations at which the median value the formed histogram exists, as described later. The latch circuit 54 latches a read-out address in response to the signal from the comparator 50.

The amplification factor determining circuit 38 is composed of a subtracter 56, a multiplier 58, an adder 60 and a latch circuit 62. The subtracter 56 compares the value latched by the latch circuit 54 with the predetermined reference value to obtain a difference between the two values.

Figure 4A:
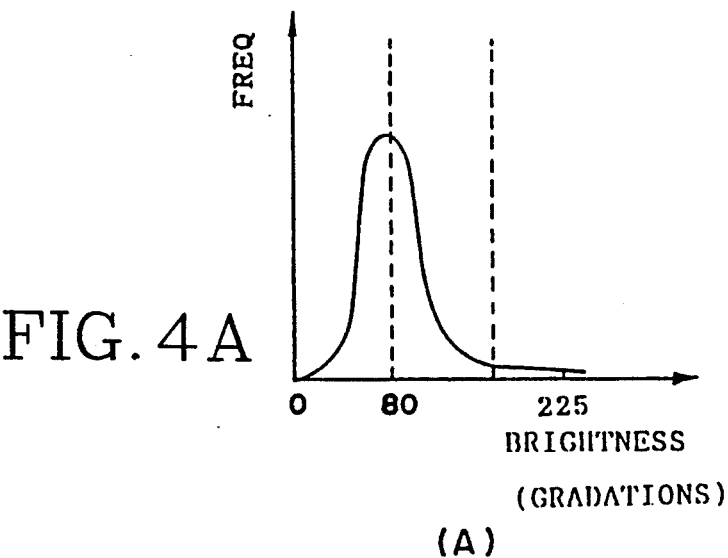
FIGS. 4(A), (B) and (C) are histograms showing the typical examples of the brightness distribution according to the optimum image conditions.

This reference value is a median value of the histogram having a brightness distribution of the image most easy to see from the standpoint of human sense of sight, which is based on experiences. In other words, the inventors have studied the image conditions of the best visibility from the standpoint of the human sense of sight, in order to determine the standard of adjusting the most suitable image conditions. The studied results indicate that the images forming the histograms as shown in FIGS. 4(A), (B) and (C) are the optimum images. These histograms roughly appears in the form of Gaussian distribution. The fact that the Gaussian distribution can be obtained when the histogram as described above are formed is the phenomenon particular to the ultrasonic image, which is based upon property of ultrasonic waves. Further, in these histograms, both right and left side areas are roughly equal to each other with respect to the 80th gradation.

In this case, therefore, the reference value is determined to be the gradation of 80th. However, the image conditions of the best visibility are somewhat different according to individual senses and additionally there exists the case where a part of the image is required to be seen in an emphasized condition. Therefore, it is preferable to construct the control section so that the reference value can be determined appropriately.

Therefore, the subtracter 56 subtracts an actual median brightness value from the reference value, and outputs the subtracted value. In this case, the subtracted value indicates the amount of shift of the actual median brightness value with respect to the reference value. The subtracted value of the subtracter 56 is inputted to the multiplier 58 to multiply the subtracted value by a constant weight value "β". Here, this weighting value "β" is set to be 0.25, for instance. This is because when a large subtracted value is outputted as it is as a value to adjust the gain, the amplification factor of the echo signals changes abruptly and therefore the ultrasonic image changes suddenly, which results in that an image becomes not easy to see. In other words, it is preferable to change the brightness value gradually, without changing the ultrasonic image abruptly, by the above-mentioned weighing processing. The adder 60 has one input terminal to which the amount of shift weighted by the multiplier 58 is inputted and the other input terminal to which the signal latched by the latch circuit 62 is inputted. That is, the amount of shift is added to the current gain in cooperation of the adder 60 and the latch circuit 62, so that an updated gain value is calculated.

The above-mentioned difference between the current value and the updated value is converted into an analog value by a D/A converter 64. The signal corresponding to the analog value is applied to the gain circuit 12 as the gain signal, so that the level of the echo signals is amplified to the optimum level automatically.

The operation of the above-mentioned gain control section 26 will be described in further detail hereinbelow.

As shown in FIG. 3, the digital signals fed from the A/D converter 20 to the gain control section 26 are once written in the frame memory 32. The frame memory 32 includes the memory cells corresponding to the 128×512 pixels, as already described, and the image brightness is stored in each memory cell pixel by pixel as 8-bit quantization data. In order to form the histogram, the 8-bit data corresponding to each pixel is read out one by one, and the read data are fed to the histogram forming circuit 34.

In the histogram forming circuit 34, the data read from the frame memory 32 are first fed to the histogram RAM 40. In more detail, the digital data fed from the frame memory 32 are supplied to an address terminal of the histogram RAM 40. As already described, since the histogram RAM 40 includes at least 256 memory locations according to the brightness gradations, the addresses at which the data corresponding to the brightness values at the respective pixels are to be written are designated in accordance with the digital signals transmitted from the frame memory 32. In more detail, when the gradation value corresponding to the brightness value at a pixel stored in the frame memory 32 is 64, the 64th address of the histogram RAM 40 is designated as the address at which the data is to be written. In this case, the data indicative of the number of pixels stored at the same address is applied to the increment circuit 42 and then incremented to a new numerical value to which "one" is added. The incremented data is latched by the latch circuit 44, and stored again in the same address of the histogram RAM 40. As a result, when the 64th address of the histogram RAM 40 is designated and further the numerical value (the number of times) at this address in the memory cell is 10, an incremented result of 11 is written at the 64th address as an updated numerical data.

By executing the above-mentioned processing for all the data stored in the frame memory 32, it is possible to produce the histogram information which represents the histogram in which the brightness values of the image to be displayed are taken on the abscissa as gradations and the numbers of pixels having the respective corresponding brightness values are taken on the ordinate as frequencies in the histogram RAM 40. However, it is necessary to previously reset the data in the histogram RAM 40 before the histogram information is produced.

After the histogram information has been produced, the median value of the histogram is decided. In more detail, the histogram reading counter 52 starts counting. The counting method is either of up counting or down counting. In this embodiment, the up counting method is assumed to be adopted. The counted result is used as an address for reading out data from the histogram RAM 40. The read-out data, that is, the frequency (the number of times) of the histogram is inputted to the adder 46. In practice, since the counted value of the histogram reading counter 52 starts beginning from zero, the data at 0th address of the histogram RAM 40 (which indicates the number of pixels having the gradation value "0") is inputted to the adder 46. In this embodiment, since the latch circuit 48 is previously reset, the data is latched as it is by the latch circuit 48. Thereafter, since the counted value of the histogram reading counter 52 changes to "1", the data at the first address of the histogram RAM 40 (which indicates the number of pixels having the gradation value "1") is inputted to the adder 46. In this case, the adder 46 adds the value (which indicates the number of pixels having the gradation "0") latched by the latch circuit 44 and the value (which indicates the number of pixels having the gradation "1") inputted from the histogram RAM 40. The latch circuit 48 latches the added results. The same operations are repeated in the same way.

By executing the above-mentioned operation, it is possible to obtain the total value of the frequencies (the total numbers of pixels) of the histogram beginning from the gradation value "0" in sequence. The obtained total value is latched by the latch circuit 48. On the other hand, it is necessary to know whether the obtained total value reaches the median value. In the present embodiment, this is detected by the comparator 50. In more detail, the half value of the total numbers of the pixels is compared with this total value latched by the latch circuit 48, in order to detect as to whether the total value latched by the latch circuit 48 reaches the half of the histogram area.

As a result of the comparison, when the total value latched by the latch circuit 48 reaches the half of the total number of the pixels, the comparator 50 outputs a signal to the latch circuit 54. In response to this signal, the latch circuit 54 latches the current value counted by the histogram reading counter 52. This counted value indicates the gradation value at the time when the values of the data stored in the histogram RAM 40 are added beginning from the gradation "0" and the total value thereof reaches the median value. The signal latched by this latch circuit 54 is fed to the amplification factor determining circuit 38.

The amplification factor determining circuit 38 subtracts the obtained median value from the predetermined reference median value to calculate a shift value of the histogram.

In more detail, in the amplification factor determining circuit 38, the brightness value at the median value of the histogram outputted from the latch circuit 54 is fed to one input terminal of the subtractor 56; and on the other hand, the data indicative of this reference value is inputted to the other input terminal of the subtracter 56. This reference value indicates the brightness value of the gradations at which the median value of a reference histogram is located; that is, the brightness value of the gradations at which the median value of the histogram of the optimum image (the most easy to see from the standpoint of human sense of sight) belongs. In the cases of the histograms shown in FIGS. 4 (A), (B) and (C), the reference value is 80.

Therefore, the subtracter 56 subtracts the brightness value at the actual median value from the reference brightness value, and outputs the subtracted value. Here, the subtracted value indicates the shift value as already described. The subtracted value outputted from the subtracter 56 is inputted to the multiplier 58 and multiplied by the constant weighting value "$\beta$". Therefore, as already explained, it is possible to change the brightness value gradually without changing the ultrasonic image abruptly. The value weighted by the multiplier 58 as the shift value is inputted to one input terminal of the adder 60, and the signal latched by the latch circuit 50 is inputted to the other input terminal of the adder 60. Therefore, the shift value is added to the current gain in cooperation of the adder 60 and the latch circuit 62, so that the updated gain can be calculated as described above.

The calculated result is outputted to the gain circuit 12 (shown in FIG. 2) through the D/A converter 64 as the gain signal, so that the gain circuit 12 amplifies the echo signals at the amplification factor corresponding to the gain signal under amplification factor control.

Figure 4B:
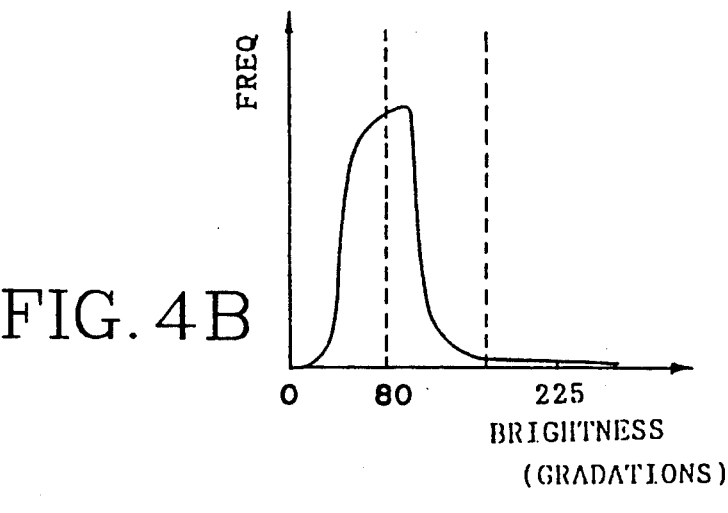
Figure 4C:
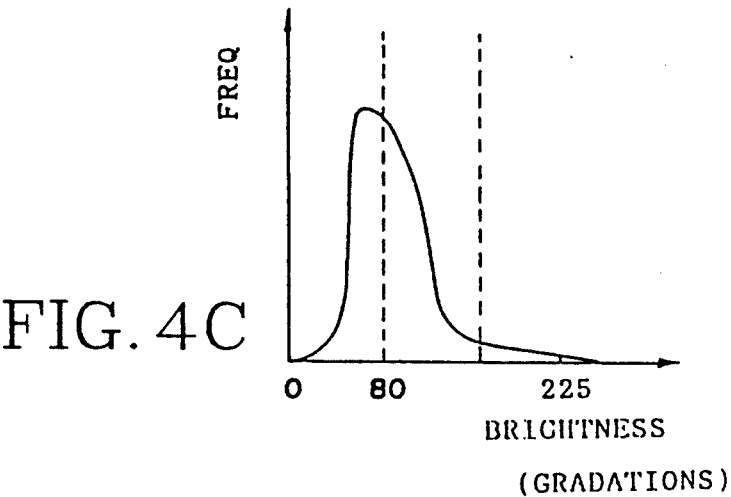

As a result, it is possible to obtain the images having the histogram characteristics similar to any one of those shown in FIGS. 4 (A), (B) and (C), so that it becomes possible to obtain the image of high visibility from the standpoint of the human sense of sight. The above-mentioned operation can be executed automatically, without need of any user's operation, thus simplifying the manipulation.

Further, the above-mentioned circuits can execute a series of the complicated processing as described above on real time bases. This is because the processing of the present embodiment is executed through pipe-line processing to increase the processing speed. For instance, it is possible to activate the histogram forming circuit 34, the median value detecting circuit 36 and the amplification factor determining circuit 38 independently or simultaneously (a plurality of processing are executed in parallel).

FIG. 5 shows a second embodiment of the gain control section 26. In the first embodiment, the median value is obtained on the basis of the histogram formed from the histogram information produced by the histogram forming circuit 34; and the brightness value of the gradations at which the median value of the histogram is located is compared with the reference value. In contrast with this, in this embodiment, the peak value of the histogram is obtained; and the brightness value of the gradations at which the peak value of the histogram is located is compared with the reference value.

In more detail, the gain control section 26 of this embodiment comprises a frame memory 102 for receiving data for one image frame on the basis of the echo signals obtained by the ultrasonic transducer 10, a frame memory reading circuit 100 for extracting echo data for forming histogram information from a reference area of the ultrasonic image formed on the basis of the echo signals, a histogram forming circuit 104 for forming the histogram information, in which the brightness values of the image to be displayed are taken on the abscissa as gradations and the numbers of pixels having the respective corresponding brightness are taken on the ordinate as frequencies, on the basis of the data within the reference area, a smoothing circuit 106 for smoothing the histogram formed by the histogram forming circuit 104, a peak value detecting circuit 108 for detecting a peak value of the histogram on the basis of the histogram information, and an amplification factor determining circuit 110 for comparing the peak value obtained by the peak value detecting circuit 108 with a predetermined reference value and determining the amplification factor so that the difference between the compared value and the reference value can be minimized.

Figure 6:
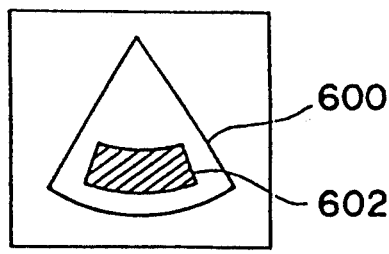
FIG. 6 is an illustration for assistance in explaining a reference area.

Specifically, the echo signals fed from the A/D converter 20 to the gain control section 26 is first stored in the frame memory 102. This frame memory 102 stores the echo data corresponding to one scanning picture, that is, the one picture of the ultrasonic image. The frame memory 102 is connected to the frame memory reading circuit 100 to receive the address signal. The frame memory reading circuit 100 extracts echo data for forming the histogram from the reference area. For instance, as shown in FIG. 6, a reference area 602 is set within a part of the sector ultrasonic image 600 obtained by sector scanning. In determining the reference area, since echo noise is generated near the ultrasonic transducer, it is preferable to set this reference area outward away from the central portion of the sector image. Further, it is also possible to configure the control section so that this reference area can be determined freely.

The echo data extracted in sequence from the frame memory 102 in accordance with the address signals supplied from the frame memory reading circuit 100 are fed to the histogram forming circuit 104 through a selector 112.

The configuration and the function of the histogram forming circuit 104 are the same as those of the first embodiment as already described. That is, the histogram forming circuit 104 comprises a histogram RAM 114, an increment circuit 116, and a latch circuit 118, which correspond to those of the histogram forming circuit 34 of the first embodiment. Therefore, in the histogram RAM 114, there is produced histogram information which constitutes a histogram in which the brightness values of the image to be displayed are taken on the abscissa as gradations and the numbers of pixels having the respective corresponding brightness are taken on the ordinate as frequencies in the same manner as the first embodiment. For this reason, the detailed description thereof is omitted herein.

After the histogram information has been established in the histogram RAM 114, the selector 112 selects the histogram reading counter 120, so that counted signals from 0 to 255 are outputted one by one from the histogram reading counter 120. The counted signals are supplied to an address terminal of the histogram RAM 114 through the selector 112, so that the data which indicates the frequency (the number of the pixels) stored in the designated address of the histogram RAM 114 is read out and then fed to a smoothing circuit 106.

The smoothing circuit 106 makes smooth the contour of the histogram formed by the histogram forming circuit 104 such that an accurate histogram shape can be obtained as the whole. This is because since the histogram formed by the histogram forming circuit 104 generally includes noise, it is necessary to prevent an erroneous detection of the peak value in the later processing from being occurred.

In more detail, in the smoothing circuit 106, the data indicative of the frequency read from the histogram RAM 114 are fed to a shift register 122 composed of 16 memory elements in this embodiment, and 16 data are stored in this shift register 122. The shift register 122 serves to determine a window to be referenced in order to smooth the histogram. Namely, first, frequency data from 0 to 15 are processed, and then the frequency data from 1 to 16 are processed, the similar processing being repeated. Here, 16 frequency data read from the shift register 50 are added by an adder 124, and the added result is once latched by a latch circuit 126, and then applied to a peak detecting circuit 108. In other words, after the frequency data have been added by the adder 124, it is essentially necessary to divide the added result by the number of frequency data. In this embodiment, however, since the ordinate of the histogram is assumed to be 16 times, it is possible to omit the divisional calculation. Therefore, the frequency data of the respective brightness values smoothed by the smoothing circuit 106 are fed to the peak value detecting circuit 108 as they are.

The peak value detecting circuit 108 serves to scan the smoothed histogram to obtain the peak (maximum) value of the brightness (gradation) value of the formed histogram.

Specifically, the frequency data fed from the smoothing circuit 106 is applied to a first input terminal of a comparator 128 of the peak value detecting circuit 108. On the other hand, the frequency data outputted from a latch circuit 130 is inputted to a second input terminal of the comparator 128. Here, when the frequency data inputted to the first input terminal of the comparator 128 is larger than that inputted to the second input terminal thereof, the comparator 128 outputs a signal 514 to the above-mentioned latch circuit 130 and further to another latch circuit 132 for receiving the count signal of a histogram reading counter 120. Therefore, it is possible to latch the maximum frequency data (i.e. the peak value) of the respective brightness values outputted from the smoothing circuit 106 in sequence by the latch circuit 130. On the other hand, it is possible to obtain the counted value (i.e. the brightness value) at the peak frequency data by the latch circuit 132. This brightness value at the peak frequency is transmitted to an amplification factor determining circuit 110.

The amplification factor determining circuit 110 subtracts the detected peak value from the previously determined reference peak value, to calculate the amount of shift of the histogram.

In more detail, in the amplification factor determining circuit 110, the brightness value at the peak frequency of the histogram which is outputted from the latch circuit 132 is transmitted to a first input terminal of a subtracter 134. On the other hand, the reference value is inputted to a second input terminal of the subtracter 134. This reference value indicates the brightness value at the reference peak value of the histogram, which corresponds to the peak value of the image histogram considered to be most easy to see from the standpoint of the human sense of sight. In this embodiment, the reference value is set to 80 gradation value as described above. However, it is possible to construct the control section so that the reference value can be changed freely in accordance with requests of the operators.

Therefore, the subtracter 134 subtracts the calculated actual peak brightness value from the reference brightness value, and outputs the subtracted value. Here, the subtracted value indicates the amount of shift of the gradation value of the obtained peak value with respect to the reference value. The subtracted value of the subtracter 134 is inputted to a multiplier 136 to multiply the subtracted value by a constant weighting value "$\beta$". Here, the weighting value "$\beta$" is determined to be 0.25, for instance. This is because, as described above with reference to the first embodiment, when a large subtracted value is outputted as it is as a value to adjust the gain, the amplification factor of the echo signal changes abruptly and therefore the ultrasonic image changes suddenly, which results in that an image is not easy to see. In other words, it is preferable to change the brightness value gradually, without changing the ultrasonic image abruptly, by the above-mentioned weighting of "$\beta$". An adder 138 has one input terminal to which the amount of shift weighted by the multiplier 136 is inputted and the other input terminal to which the signal latched by a latch circuit 140 is inputted. That is, the amount of shift is added to the current gain in cooperation of the adder 138 and the latch circuit 140, so that an updated gain value is calculated.

The calculated result is outputted to the gain circuit 12 shown in FIG. 2 through a D/A converter 142 as the gain signal. Therefore, the gain circuit 12 amplifies the echo signals at the amplification factor determined in response to the gain signal.

Figure 7A:
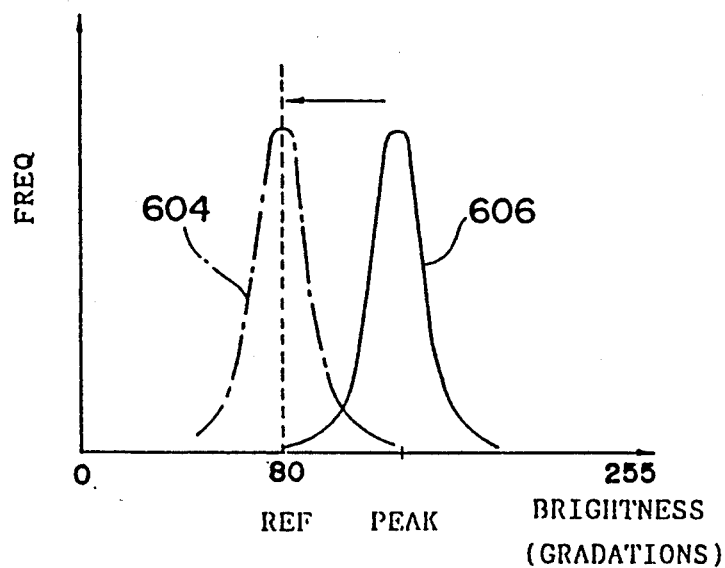
FIGS. 7(A) and (B) are graphical representations showing two histograms deviated from the reference histogram.
Figure 7B:
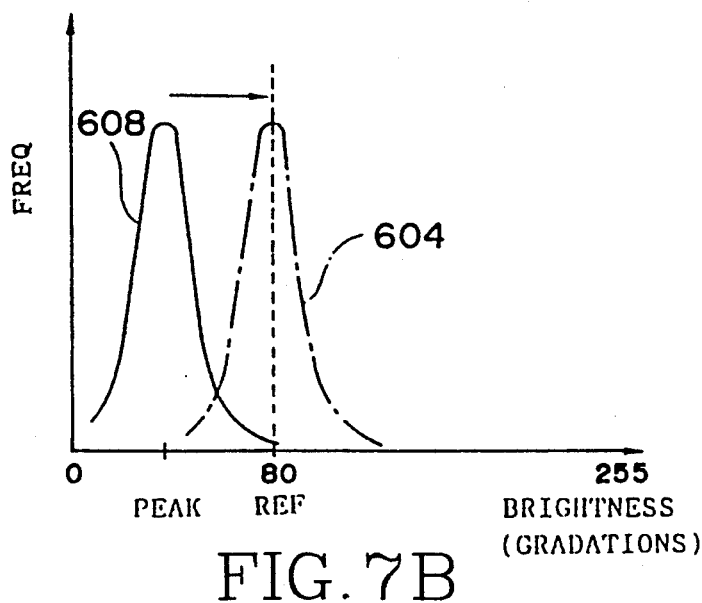

In practice, as shown in FIG. 7(A), when the histogram 606 actually formed is higher in brightness (gradation) value than the reference histogram 604, the amplification factor of the gain circuit is controlled so as to be decreased. On the other hand, as shown in FIG. 7(B), when the histogram 608 actually formed is lower in brightness value than the reference histogram 604, the amplification factor of the gain circuit is controlled so as to be increased. Therefore, if the reference value is determined to be 80 in gradation value, the amplification factor of the gain circuit 12 is so controlled that the histogram having the reference value 80 as the peak value can be obtained.

Further, the above-mentioned circuits execute a series of the complicated processing as described above on real time bases. This is because, in the same manner as the above described embodiment, the present embodiment is executed through pipe-line processing to increase the processing speed. For instance, it is possible to activate the histogram forming circuit 104, the smoothing circuit 106, the peak value detecting circuit 108, and the amplification factor determining circuit 110 independently or simultaneously (a plurality of processing are executed in parallel).

The STC control section 28 will be described in detail hereinbelow. The STC control section 28 sets a plurality of reference areas for each visual field depth in the ultrasonic beam direction, obtains the respective shift values between the reference value (e.g. 80 gradation value when the maximum brightness value is 255) and the brightness value at the peak frequency of the ultrasonic image histogram formed from the data in each of the reference areas, and controls in feedback manner the respective amplification factors of the echo signal within the respective reference areas, independently so that the brightness value at the histogram peak can be shifted to the reference value. That is, the respective histograms are formed for the echo data obtained from the respective reference areas corresponding to the respective visual field depths, and the brightness value at the peak frequency is compared with the reference value for each depth, so that the amplification factor can be controlled automatically and independently. Here, if the number of depths of the STC is 16, 16 reference areas are to be determined. However, it is not necessary to set each reference area to each visual depth. In other words, one reference area can be set so as to cover a plurality of depths.

Figure 8:
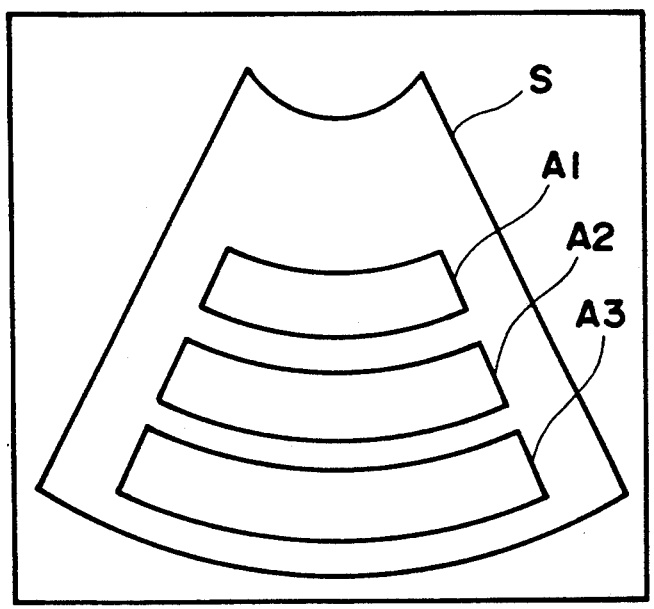
FIG. 8 is an illustration for assistance in explaining a plurality of reference areas for the respective visual field depths in a sector image.

FIG. 8 shows a scanning surface S formed by scanning the ultrasonic beams, in which the reference areas are shown by A1 to A3, by way of example. In this example, since the scanning plane S has a sector shape, the reference areas are determined in circular arc shape. That is, in this example shown in FIG. 8, the respective histograms are formed for the respective reference areas, and the amplification factor is controlled for each reference area individually.

Figure 9:
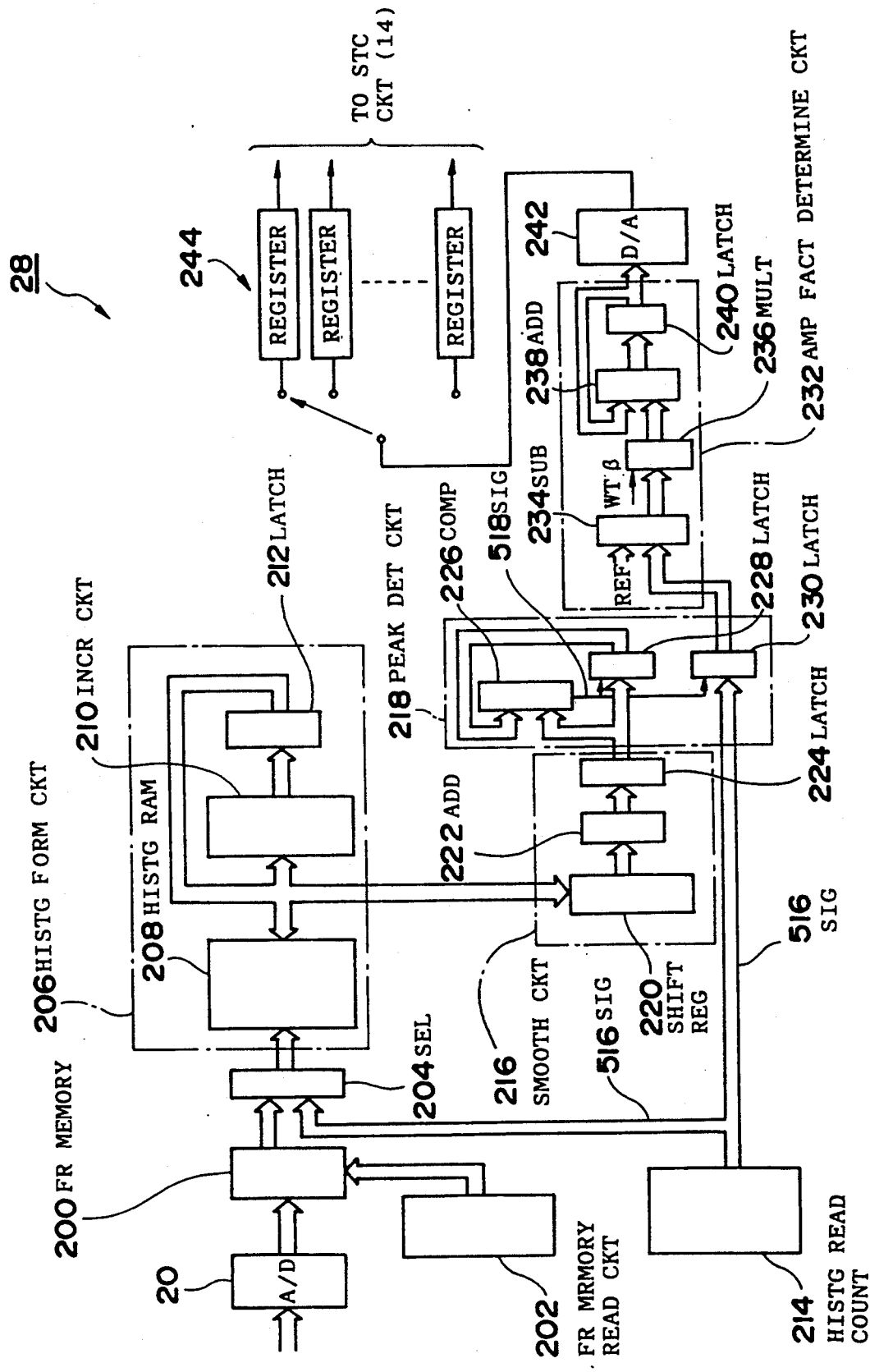
FIG. 9 is a block diagram showing an embodiment of a STC control section of the ultrasonic diagnostic apparatus according to the present invention.

FIG. 9 is a block diagram showing the configuration of the STC control section 28. The signals fed from the A/D converter 20 to the STC control section 28 is first written in a frame memory 200. In this frame memory 200, the echo signals for a single scanning plane, that is, the data for one ultrasonic image picture are stored.

To the frame memory 200, a frame memory reading circuit 202 for extracting the echo data for each reference area to form the histogram is connected to supply address signals to the frame memory 200. From the frame memory 200, the echo data within the first reference area are extracted in sequence, and then supplied to a histogram forming circuit 206 through a selector 206.

The histogram forming circuit 206 includes a histogram RAM 208, an increment circuit 210 and a latch circuit 212, which correspond to those of the histogram forming circuits 34 and 104 of the above described embodiments. In this histogram forming circuit 206, the echo data supplied from the frame memory 200 is inputted to an input terminal of the histogram RAM 208. This histogram RAM 208 has at least 256 memory locations according to the brightness gradations, and the addresses at which the echo data corresponding to the brightness values at the respective pixels are to be written are designated in accordance with the digital signals fed from the frame memory 200. In the histogram RAM 208, the frequency data stored in the memory cell, that is the number of times that the echo data having the same brightness value have been written into the address is read out whenever the same data is written additionally, and incremented by one in the increment circuit 210, and stored again in the memory cell at the same address via the latch circuit 212. In other words, one address is allocated to each brightness (gradation) value, and the frequency data in the memory cell is counted up whenever the same address is designated.

When all the data within one reference area are read out by the frame memory 200, the histogram RAM 208 forms histogram information of the ultrasonic image in the reference area, which constitute a histogram in which the brightness values of the image are taken on the abscissa as gradations and the numbers of pixels having the respective corresponding brightness are taken on the ordinate as frequencies. This processing is the same as that executed by the histogram forming circuit 34 in the gain control circuit 26 as already described.

After the above-mentioned processing, a selector switches the connection from the frame memory 200 to a histogram reading counter 214. Therefore, the address (e.g. 0 to 255) signals 516 are outputted in sequence from the histogram reading counter 214 to the histogram RAM 208, in order to read out the frequency data (histogram data) for the respective brightness value in sequence.

Accordingly, the frequency data of the respective brightness values are outputted from the histogram RAM 208 in sequence, beginning from the lowest brightness value for instance, and then applied to a peak value detecting circuit 218 through a smoothing circuit 216.

The reason why the smoothing circuit 216 is provided at the front stage of the peak value detecting circuit 218 is to smooth the contour of the histogram and thereby to prevent an erroneous peak value detection due to noise from being occurred, in the same way as the case of the gain control section 26 of the second embodiment. Therefore, in the smoothing circuit 216, a shift register 220 accumulates a predetermined number of frequency data (e.g. 7 data), and the accumulated data are added by an adder 222.

A divider may be necessary to obtain an average value of the frequency data (e.g. 7) of the predetermined numbers. However, since there exists no physical difference between the divided value and the non-divided value (the difference is only the presence or absence of divisional calculation by 7, for instance), no divisional calculation is executed in this embodiment to increase the operational speed. Further, a latch circuit 224 latches the added result momentarily for comparison by a comparator 226.

In the comparator 226 of a peak value detecting circuit 218, the current frequency data (I) outputted form the latch circuit 224 is compared with the preceding maximum frequency data (II) latched by a latch circuit 228. In this case, when the frequency data (I) is larger than the frequency data (II), a latch signal 518 is outputted from the comparator 226, so that the latch circuit 228 updates the data already held by the latching operation.

Under these conditions, since an address signal 516 is outputted from the histogram reading counter 214 to a latch circuit 230, when the latch signal 518 is outputted, the address signal (brightness level) held by the latch operation is updated.

Therefore, after a histogram has been formed from the echo data within the reference area, the respective frequency data which constitute the histogram are read out in sequence, so that the peak brightness value is held by the latch circuit 230 of the peak value detecting circuit 218.

In an subtracter 234 of an amplification factor determining circuit 232, the reference value is subtracted from the brightness value outputted from the latch circuit 230, so that it is possible to calculate the shift value on the basis of the brightness value having the peak frequency value in the histogram and the reference value. For instance, if the brightness value is 120 and the reference value is set to 80, a shift value of 40 is calculated. Further, it is possible to construct the control section so that the reference value can be set freely.

The calculated shift value is next multiplied by a weighting value "$\beta$" by a multiplier 236, and added to the preceding data (gain value) latched by a latch circuit 240 through an adder 238. This is because if the shift value is outputted as it is as the gain adjusting value, since the brightness of the image changes abruptly and therefore the image becomes not easy to see, the weighting value "$\beta$" ($\leq 1$) is multiplied to avoid the abrupt change of the image brightness. Further, the adder 238 is used to add the gain adjusting value to the preceding gain.

Thereafter, the gain signal outputted from the latch circuit 240 is converted into an analog signal by a D/A converter 242, stored in a plurality of registers 244 provided for each visual field depth of the STC, in order to amplify the echo signal within each reference area of each depth individually, in the STC circuit 14 shown in FIG. 2. Further, a plurality of shift registers 244 of which number is the same as the number of the STC visual field depths are provided. For instance, if the two depths are determined within the single reference area, two different gain values are stored in the two registers, independently.

By repeatedly executing the above-mentioned operation for each reference area, finally it is possible to automatically determine the optimum gain for each depth, so that the image having the optimum brightness can be obtained according to the respective visual field depths.

Further, the above-mentioned circuits can execute a series of the complicated processing as described above on real time bases. This is because, in the same manner as the above described embodiments, the processing in the present embodiment is executed through pipe-line processing to increase the processing speed. For instance, it is possible to activate the histogram forming circuit 206, the smoothing circuit 216, the peak value detecting circuit 218, and the amplification factor determining circuit 232 independently or simultaneously (a plurality of processing are executed in parallel at the same time points).

In the present embodiment, the peak value is obtained from the histogram formed by the histogram forming circuit 206 and further the brightness (gradation) value at which the peak frequency value is located is compared with the reference value. However, it is also possible to obtain a median value from the histogram and further to compare the brightness (gradation) value at which the median value is located with the reference value, in the same way as the first embodiment.

Figure 10:
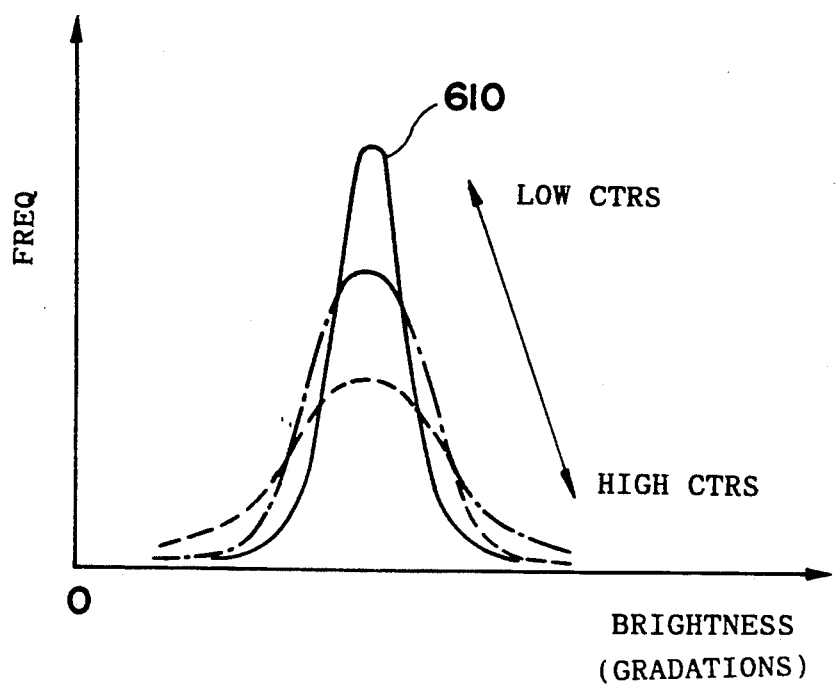
FIG. 10 is a graphical representation for assistance in explaining the relationship between the change in histogram and the adjustment of contrast.

The contrast control section 30 will be described in detail hereinbelow. FIG. 10 shows a typical histogram 610 of the ordinary ultrasonic image, in which the frequency (the number of pixels) having the respective brightness values is graphed.

As depicted in FIG. 10, when the contrast is increased, the convex portion of the histogram is made flat, so that the light and shade is clear in the image. In contrast, when the contrast is decreased, the convex portion of the histogram is made sharp, so that the light and shade is vague in image. As already described, the experiments indicate that when the histograms of ultrasonic images of various sorts are formed, the shape of the obtained histograms forms Gaussian distribution. In the present invention, therefore, the contrast is automatically adjusted by use of the property of the ultrasonic images.

Figure 11:
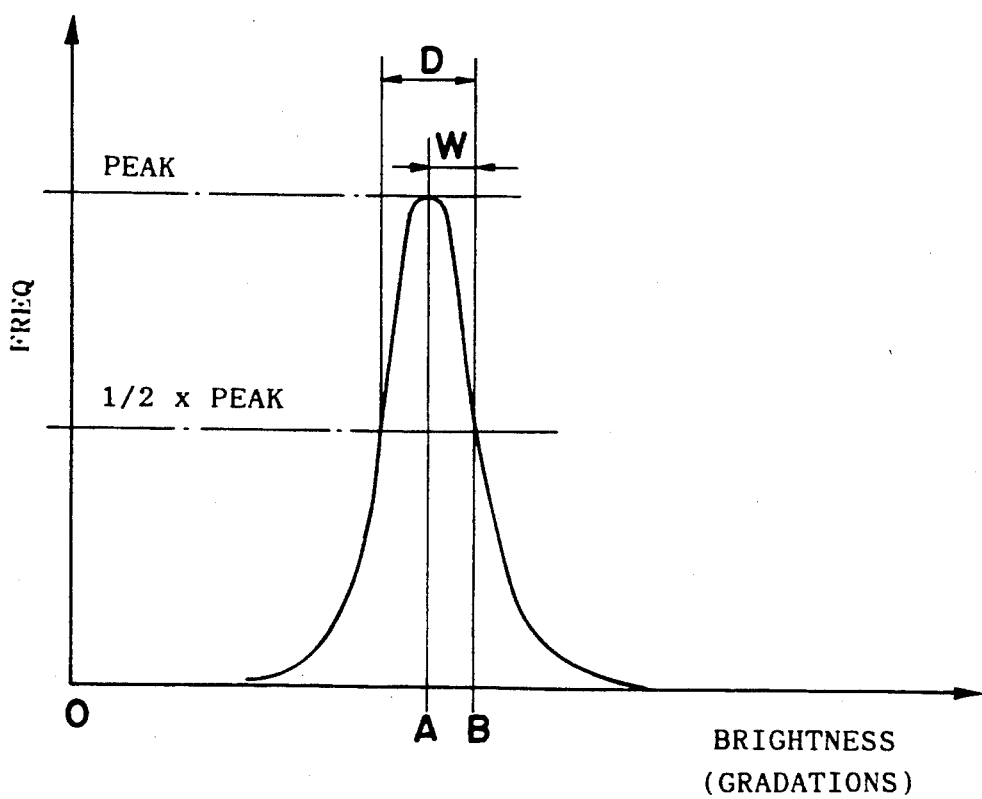
FIG. 11 is a graphical representation for assistance in explaining the width value W determined as the compared value.

In more detail, as shown in FIG. 11, in the present invention, the width value W is used as an index value representative of the spread of the histogram. Here, the width value W is a half of the width D (hereinafter, referred to as half-value width). In this case, it is possible to use the half-value width D itself as the index value. However, in this embodiment, since experiments indicate that other minor convex portions are sometimes superposed upon the major convex portion on the left side (lower brightness side) of the formed histogram, the width value W on the higher brightness side is adopted in view of the determination precision. In this connection, it should be noted that the minor convex portions often appear when a fetus in amniotic fluid is observed.

Therefore, by comparing the actual width value W with a reference width value which is obtained from an image having the optimum image contrast, it is possible to obtain the contrast adjusting value indicative of change in contrast to be shifted on the basis of the difference between the two. Further, it is also possible to construct the control section so that the reference value can be changed.

Figure 12:
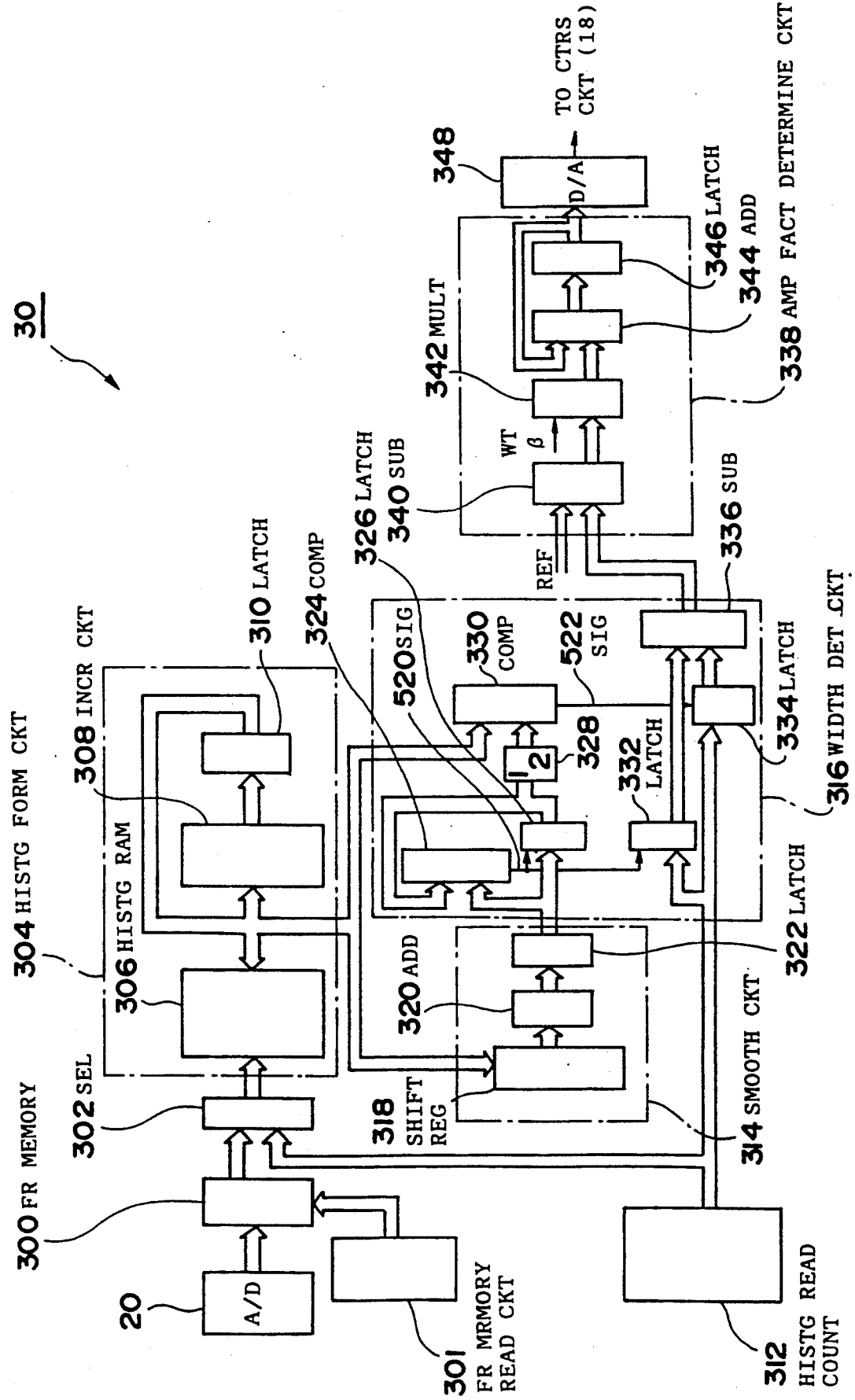
FIG. 12 is a block diagram showing an embodiment of a contrast control section of the ultrasonic diagnostic apparatus according to the present invention.

In FIG. 12, the signals supplied from the A/D converter 20 to the contrast control section 30 is first written in a frame memory 300. Here, the echo signals corresponding to the single frame of the ultrasonic image are written in the frame memory 300 as 8-bit data. To the frame memory 300, a frame memory reading circuit 301 for extracting the echo data for each reference area to form the histogram is connected, to supply address signals to the frame memory 300. It is possible to construct the control section so that the reference area can be set to any desired position in the image. The echo signals extracted from the frame memory 300 in sequence in response to the address signals from the frame memory reading circuit 301 are applied to an address terminal of the histogram RAM 306 of a histogram forming circuit 304.

This histogram RAM 306 produces histogram information which forms a histogram as shown in FIG. 10. In more detail, when the echo data read out of the frame memory 300 are inputted to the address terminal of the histogram RAM 306, the frequency data in the memory cell designated by the address is read out, incremented by one by an increment circuit 308, and then written in the cell of the same address again through a latch circuit 310. As a result, it is possible to produce histogram information which forms the histogram in the histogram RAM 306 by counting up the respective frequency data. In this regard, it should be noted that the structure and the operation of the histogram forming circuit 304 are the same as those of the above described embodiments, so that more detailed explanation thereof is omitted.

After the histogram has been formed, a histogram reading counter 312 starts to count, and simultaneously a selector 302 selects the connection to a histogram reading counter 312. Therefore, the histogram reading counter 312 generates address signals in sequence beginning from "0", and the generated address signals are outputted to an address terminal of the histogram RAM 306 through the selector 302, so that the frequency data of the respective brightness values are read out in sequence from the histogram RAM 306. The read frequency data is outputted to a width value detecting circuit 316 through a smoothing circuit 314.

The smoothing circuit 314 includes a shift register 318 composed of 7 register elements, for instance, an adder 320 for adding the outputs of the respective register elements of the shift register 318, and a latch circuit 322. This is because, as stated in the above with reference to the other embodiment, since the formed histogram sometimes includes noise component, the histogram is smoothed to improve the precision of detecting the width value. The smoothing method is carried out such that a predetermined number of frequency data are inputted to the shift register 318 being arranged in parallel to each other and then the inputted data are added each other. In this case, it may be necessary to divide the added value by a predetermined constant value to obtain an average value. However, since the added value and the divided value are both the same in physical viewpoint, no divisional calculation is executed in this embodiment to increase the operational speed.

In a width detecting circuit 316, the frequency data latched by a latch circuit 322 is inputted to a first input terminal of a comparator 324, and the preceding maximum frequency data latched by a latch circuit 326 is inputted to a second input terminal of the comparator 324. When the current frequency data outputted by the latch circuit 322 is larger than that outputted by the latch circuit 324, the comparator 324 outputs a latch signal 520, so that the maximum frequency data latched by the latch circuit 326 is updated.

On the other hand, the output of the latch circuit 326 is reduced to ½ by a computing element 328, and then outputted to a first input terminal of a comparator 330. On the other hand, the frequency data outputted from the histogram forming circuit 304 is inputted to a second terminal of the comparator 330. When the frequency data outputted from the histogram forming circuit 304 is larger than a half of the frequency data outputted from the latch circuit 326, the comparator 330 outputs a latch signal 522.

On the other hand, the address signal outputted from the histogram reading counter 312 is applied to the latch circuit 332 and the latch circuit 334; the latch signal 520 is applied to the latch circuit 332; and the latch signal 522 is applied to the latch circuit 334.

Therefore, the frequency data is compared through the comparator 324 and the comparator 330, and finally the brightness value (the address) at which the peak value of the histogram is located is held by the latch circuit 332. On the other hand, the brightness value (the address) at which a half of the peak value of the histogram is located on the higher brightness side is held by the latch circuit 334. That is, in FIG. 11, the brightness value A is held by the latch circuit 332, and the brightness B is held by the latch circuit 334. A subtracter 336 obtains a difference between the two brightness values "A" and "B", and the obtained difference data is outputted to an amplification factor determining circuit 338.

In the amplification factor determining circuit 338, a subtracter 340 subtracts the reference value from the difference data, to obtain an index value which indicates an offset between the histogram formed by the histogram RAM 304 and an ideal histogram of Gaussian distribution. The subtraction value outputted from the subtracter 340 is multiplied by a predetermined weighting value "$\beta$" through a multiplier 342, and then outputted to an adder 344. The adder 344 adds the preceding contrast adjusting data held by the latch circuit 346 and the contrast adjusting data to which the weighting value "$\beta$" is multiplied. In other words, by multiplying the contrast adjusting data by the weighting value "$\beta$" ($\leq 1$), it is possible to change the current contrast gradually to the ideal contrast.

The contrast signal outputted from the amplification determining circuit 338 is converted into an analog signal by a D/A converter 348, and supplied to the contrast circuit 18 shown in FIG. 2 as the contrast control signal, so that the contrast circuit 18 adjusts the image contrast as shown in FIG. 10.

Accordingly, in the ultrasonic diagnostic apparatus according to the present invention, the optimum image contrast can be obtained automatically, so that it is possible to display the ultrasonic image under the optimum contrast condition at all times.

Further, the above-mentioned circuits can execute a series of the complicated processing as described above on real time bases. This is because, in the same manner as the above described embodiments, the present embodiment is executed through pipe-line processing to increase the processing speed. For instance, it is possible to activate the histogram forming circuit 304, the smoothing circuit 314, the width value detecting circuit 316, and the amplification factor determining circuit 338 independently or simultaneously (a plurality of processing are executed in parallel at some time points).

As described above, in the ultrasonic diagnostic apparatus according to the present invention, the histogram of the image considered as being optimum from the standpoint of human sense of sight is compared with the histogram of the image obtained on the basis of the echo signal received by the ultrasonic transducer; the difference between the two is obtained; and the gain circuit 12, the STC circuit 14 and the contrast circuit 18 are controlled in feedback fashion according to the obtained difference, respectively, so that it is possible to obtain the ultrasonic image optimum in brightness and contrast level automatically. Therefore, it is possible to eliminate the manual and skilled operation for adjusting various image levels so far needed in the conventional diagnostic apparatus. In addition, the diagnostic apparatus of the present invention can cope with change in the human tissue of the part to be diagnosed flexibly and promptly, while simplifying the manipulation of the ultrasonic diagnostic apparatus.

Further, in the above-mentioned embodiments, the gain circuit 12, the STC circuit 14 and the contrast circuit 18 are all automatically controlled by the gain control section 26, the STC control section 28 and the contrast control section 30, respectively. However, it is of course possible to switch all or a part of these control operations to manual operations by use of manually operated switches which are separately provided in the apparatus.

Furthermore, although the gain control section 26, the STC control section 28 and the contrast control section 30 are all configured as a separate circuit, respectively, it is possible to use some control circuit elements of the control sections in common. For instance, it is possible to use the frame memory 102, the frame memory reading circuit 100, the selector 112 and the histogram forming circuit 104 of the gain control section 26 in common with the frame memory 300, the frame memory reading circuit 301, the selector 302 and the histogram forming circuit 304 of the contrast control section 30.

Finally, it should be noted that the present invention is not limited to only the embodiments described above, and therefore various changes and modifications may be of course made within the scope defined by the appended claims.

What is claimed is:

1. An ultrasonic diagnostic apparatus, comprising:
   an ultrasonic transducer for transmitting and receiving ultrasonic waves to and from a body to by examined; and
   control means for automatically determining optimum image conditions on the bases of a first histogram formed from echo signals from the ultrasonic waves received by said ultrasonic transducer and a second, predetermined reference histogram corresponding to the optimum image.

2. The ultrasonic diagnostic apparatus of claim 1, wherein said control means for automatically determining the optimum image conditions comprises:
   histogram forming means for forming the first histogram, in which the first histogram is formed by taking brightness values of an image to be displayed on an abscissa as gradations and taking the numbers of pixels having the respective corresponding brightness values on an ordinate as frequencies; and
   echo signal amplification factor control means for comparing a value obtained from the first histogram with a predetermined reference value from the second reference histogram and then for controlling an amplification factor of the echo signals so as to eliminate the difference between the compared value and the reference value.

3. The ultrasonic diagnostic apparatus of claim 1, further comprising:
   echo signal amplifying means for amplifying the echo signals obtained by said ultrasonic transducer;
   wherein said control means for automatically determining the optimum image conditions comprises echo signal amplification factor control means for automatically controlling an amplification factor of said echo signal amplifying means on the bases of the first histogram and the predetermined reference histogram.

4. The ultrasonic diagnostic apparatus of claim 3, wherein said echo signal amplification factor control means comprises:
   histogram forming means for forming the first histogram by taking brightness values of an image to be displayed on an abscissa as gradations and taking the numbers of pixels having the respective corresponding brightness values on an ordinate as frequencies;
   compared value detecting means for detecting a compared value on the basis of the first histogram; and
   amplification factor determining means for comparing the compared value with a predetermined value of the reference histogram and for determining the echo signal amplification factor so as to eliminate the difference between the compared value and the predetermined value, wherein the echo signals are amplified by said echo signal amplifying means in accordance with the determined echo signal amplification factor.

5. The ultrasonic diagnostic apparatus of claim 4, wherein said compared value detecting means comprises means for detecting a brightness value at a gradation to which a median value of the first histogram is located on the basis of the first histogram.

6. The ultrasonic diagnostic apparatus of claim 4, wherein said compared value detecting means comprises means for detecting a brightness value at a gradation at which a peak value of the first histogram is located on the basis of the first histogram.

7. The ultrasonic diagnostic apparatus of claim 4, wherein said echo signal amplification factor control means further comprises means for determining a reference area from which the echo signals are extracted to form the histogram.

8. The ultrasonic diagnostic apparatus of claim 7, wherein said compared value detecting means comprises means for detecting a brightness value at a gradation to which a peak value of the first histogram is located on the basis of the first histogram.

9. The ultrasonic diagnostic apparatus of claim 4, wherein said echo signal amplification factor control means further comprises means for smoothing the formed histogram.

10. The ultrasonic diagnostic apparatus of claim 1, further comprising:
    individual echo signal amplifying means for amplifying an echo signal individually for each visual field depth on the basis of the echo signals obtained by said ultrasonic transducer:
    wherein said control means for automatically determining the optimum image conditions comprises individual echo signal amplification factor control means for automatically controlling amplification factors of said individual echo signal amplifying means for the respective visual field depths in an ultrasonic beam direction on the basis of the first histogram formed from the echo signals and the second predetermined reference histogram corresponding to the optimum image condition.

11. The ultrasonic diagnostic apparatus of claim 10, wherein said individual echo signal amplification factor control means comprises:
    means for extracting a plurality of reference areas at the respective visual field depths in the ultrasonic beam direction from the obtained echo signals;
    histogram forming means for forming the first histogram on the basis of the echo signals in each of the extracted reference areas, in which the first histogram is formed by taking brightness values of an image to be displayed on an abscissa as gradations and taking the numbers of pixels having the respective corresponding brightness values on an ordinate as frequencies;

compared value detecting means for detecting a compared value from the respective first histogram; and amplification factor determining means for comparing each of the compared values with a predetermined reference value corresponding to the optimum image condition and for determining the echo signal amplification factors so as to eliminate the respective differences between each of the compared values and each reference value, respectively, wherein the echo signals for the respective visual field depths are amplified by said individual echo signal amplifying means in accordance with the determined echo signal amplification factors, respectively.

12. The ultrasonic diagnostic apparatus of claim 11, wherein said compared value detecting means comprises means for obtaining a brightness value at a gradation to which a peak value of the histogram is located on the basis of the formed histogram of each reference area.

13. The ultrasonic diagnostic apparatus of claim 1, further including contrast adjusting means for adjusting contrast level of an image to be displayed on the basis of the echo signals obtained by said ultrasonic transducer; wherein said control means for automatically determining the optimum image condition comprises contrast control means for automatically controlling the contrast level by said contrast adjusting means on the bases of the first histogram formed from the echo signals and the predetermined reference histogram corresponding to the optimum image condition having a certain contrast.

14. The ultrasonic diagnostic apparatus of claim 13, wherein said compared value detecting means comprises means for detecting a predetermined width value at a constant height of the formed histogram.

15. The ultrasonic diagnostic apparatus of claim 14, wherein said contrast control means further comprises means for determining a reference area from which the echo signals are extracted to form the histogram.

16. The ultrasonic diagnostic apparatus of claim 14, wherein said compared value detecting means comprises means for detecting a predetermined width at a constant height of the histogram on the basis of the smoothed histogram.

17. The ultrasonic diagnostic apparatus of claim 16, wherein the formation of the histogram, the smoothing of the histogram, the detection of the predetermined width value, and the comparison of the width value with the predetermined reference value are all executed in pipe-line processing.

18. An ultrasonic diagnostic apparatus comprising:
an ultrasonic transducer for transmitting and receiving ultrasonic waves to and from a body to be examined;
control means for automatically determining the optimum image conditions on the basis of echo signals obtained by said ultrasonic transducer based on the received ultrasonic waves;
echo signal amplifying means for amplifying the echo signals obtained by said ultrasonic transducer;
said control means for automatically determining the optimum image conditions including echo signal amplification factor control means for automatically controlling an amplification factor of said echo signal amplifying means on the basis of the echo signals obtained by said ultrasonic transducer;
histogram forming means for forming a first histogram on the basis of the echo signals obtained by said ultrasonic transducer, in which the histogram represented by the histogram information is formed by taking brightness values of an image to be displayed on an abscissa as gradations and taking the numbers of pixels having the respective corresponding brightness values on an ordinate as frequencies;
compared value detecting means for detecting a compared value on the basis of the first histogram information; and
amplification factor determining means for comparing the compared value obtained by said compared value detecting means with a predetermined value and for determining the echo signal amplification factor so as to eliminate the difference between the compared value and the reference value, wherein the echo signals are amplified by said echo signal amplifying means in accordance with the determined echo signal amplification factor;
said echo signal amplification factor control means further including means for smoothing the first histogram;
said compared value detecting means including means for detecting a brightness value at a gradation to which a peak value of the smoothed histogram is located on the basis of the first histogram.

19. The ultrasonic diagnostic apparatus of claim 18, wherein the formation of the histogram, the smoothing of the histogram, the detection of the brightness value at a gradation to which the peak value of the histogram is located, and the comparison of the brightness value with the reference value are all executed in pipe-line processing.

20. An ultrasonic diagnostic apparatus comprising:
an ultrasonic transducer for transmitting and receiving ultrasonic waves to and from a body to be examined;
control means for automatically determining the optimum image conditions on the basis of echo signals obtained by said ultrasonic transducer based on the received ultrasonic waves;
individual echo signal amplifying means for amplifying an echo signal individually for each visual field depth on the basis of the echo signals obtained by said ultrasonic transducer;
individual echo signal amplification factor control means for automatically controlling amplification factors of said individual echo signal amplifying means for the respective visual field depths in an ultrasonic beam direction on the basis of the echo signals obtained by said ultrasonic transducer, said individual echo signal amplification factor control means including;
means for extracting a plurality of reference areas including the echo signals at the respective visual field depths in the ultrasonic beam direction on the basis of the echo signals obtained by said ultrasonic transducer;
histogram forming means for forming a histogram on the basis of the echo signals in each of the extracted reference areas, in which the histogram is formed by taking brightness values of an image to be displayed on an abscissa as gradations and taking the numbers of pixels having the respective corresponding brightness values on an ordinate as frequencies;

compared value detecting means for detecting a compared value from the respective histogram information; and amplification factor determining means for comparing each of the compared values obtained by said compared value detecting means with a predetermined reference value and for determining the echo signal amplification factors so as to eliminate the respective differences between each of the compared values and the reference value, respectively, wherein the echo signals for the respective visual field depths are amplified by said individual echo signal amplifying means in accordance with the determined echo signal amplification factors, respectively;

said echo signal amplification factor control means including means for smoothing the formed histogram information.

21. The ultrasonic diagnostic apparatus of claim 20, wherein said compared value detecting means comprises means for detecting a brightness value at a gradation to which a peak value of the histogram is located on the basis of the smoothed histogram.

22. The ultrasonic diagnostic apparatus of claim 21, wherein the formation of the histogram, the smoothing of the histogram, the detection of the brightness value, and the comparison of the brightness value with the reference value are all executed in pipe-line processing.

23. An ultrasonic diagnostic apparatus comprising:
an ultrasonic transducer for transmitting and receiving ultrasonic waves to and from a body to be examined;
control means for automatically determining the optimum image conditions on the basis of echo signals obtained by said ultrasonic transducer based on the received ultrasonic waves basis;
contrast adjusting means for adjusting contrast level of an image to be displayed on the basis of the echo signals obtained by said ultrasonic transducer;
said control means for automatically determining the optimum image condition including contrast control means for automatically controlling the contrast level adjusted by said contrast adjusting means based on the echo signals obtained by said ultrasonic transducer;
histogram forming means for forming histogram information on the basis of the echo signals obtained by said ultrasonic transducer, in which a histogram represented by the histogram information is formed by taking brightness values of an image to be displayed on an abscissa as gradations and taking the numbers of pixels having the respective corresponding brightness values on an ordinate as frequencies;
compared value detecting means for detecting a compared value on the basis of the histogram information; and
contrast level determining means for comparing the compared value obtained by said compared value detecting means with a predetermined reference value and for determining the contrast adjustment level so as to eliminate the difference between the compared value and the predetermined reference value, wherein the contrast level is adjusted by amplifying the echo signals through said contrast adjusting means in accordance with the determined contrast adjustment level.

24. An ultrasonic diagnostic apparatus comprising:
an ultrasonic transducer for transmitting and receiving ultrasonic waves to and from a body to be examined;
control means for automatically determining the optimum image conditions based on a histogram formed from echo signals obtained by said ultrasonic transducer based on the received ultrasonic waves;
contrast adjusting means for adjusting contrast level of an image to be displayed on the basis of the echo signal obtained by said ultrasonic transducer;
said control means for automatically determining the optimum image condition including contrast control means for automatically controlling the contrast level adjusted by said contrast adjusting means on the basis of the echo signals obtained by said ultrasonic transducer; and
means for smoothing the formed histogram.

25. An ultrasonic diagnostic apparatus, comprising:
an ultrasonic transducer for transmitting and receiving ultrasonic waves to and from a body to be examined;
echo signal amplifying means for amplifying echo signals obtained by said ultrasonic transducer based on the received ultrasonic waves;
echo signal amplification factor control means for automatically controlling amplification factor of said echo signal amplifying means on the bases of a first histogram formed from the obtained echo signals and a predetermined reference histogram corresponding to the optimum image condition having a certain brightness;
individual echo signal amplifying means for amplifying an echo signal individually for each visual field depth on the basis of the obtained echo signals;
individual echo signal amplification factor control means for automatically controlling the amplification factors of said individual echo signal amplifying means for the respective visual field depths in an ultrasonic beam direction on the bases of a second histogram formed from the obtained echo signals and a predetermined reference histogram corresponding to the optimum image condition having a certain brightness;
contrast adjusting means for adjusting contrast level of an image displayed on the basis of echo signals obtained by said ultrasonic transducer; and
contrast control means for automatically controlling the contrast level adjusted by said contrast adjusting means on the bases of a third histogram formed from the echo signals and a predetermined reference histogram corresponding to the optimum image condition having a certain contrast.

26. The ultrasonic diagnostic apparatus of claim 25, wherein:
said echo signal amplification factor control means includes:
histogram forming means for forming the first histogram on the basis of the obtained echo signals, in which the first histogram is formed by taking brightness values of an image to be displayed on an abscissa as gradations and taking the numbers of pixels having the respective corresponding brightness values on an ordinate as frequencies;
compared value detecting means for detecting a compared value on the first histogram; and
amplification factor determining means for comparing the compared value with a predetermined reference value and for determining the echo signal amplification factor so as to eliminate a difference between the compared value and the reference value, wherein the echo signal is amplified by said echo signal amplifying means in accordance with the determined echo signal amplification factor;

said individual echo signal amplification factor control means including;

means for extracting a plurality of reference areas at the respective visual field depths in the ultrasonic beam direction from the obtained echo signals;

histogram forming means for forming the second histogram on the basis of the obtained echo signals in each of the extracted reference areas, in which the second histogram is formed by taking brightness values of an image to be displayed on an abscissa as gradations and taking the numbers of pixels having the respective corresponding brightness values on an ordinate as frequencies;

compared value detecting means for detecting compared values on the basis of the respective histogram; and amplification factor determining means for comparing the respective compared values with predetermined reference values and for determining the echo signal amplification factors so as to eliminate the differences between each of the compared values and the reference value, respectively, wherein the echo signals for the respective visual field depths are amplified by said individual echo signal amplifying means in accordance with the determined echo signal amplification factors, respectively;

said contrast control means including:

histogram forming means for forming the third histogram on the basis of the echo signals, in which the third histogram is formed by taking brightness values of image to be displayed on an abscissa as gradations and taking the numbers of pixels having the respective corresponding brightness values on an ordinate as frequencies;

compared value detecting means for detecting a compared value on the basis of the third histogram; and contrast level determining means for comparing the compared value with a predetermined reference value and for determining the contrast adjustment level so as to eliminate the difference between the compared value and the reference value, wherein the contrast level is adjusted by amplifying the echo signals through said contrast adjusting means in accordance with the determined contrast adjustment level.

27. A method of diagnosing a living body by ultrasonic waves, comprising the steps of:

transmitting ultrasonic waves to a body to be examined and receiving echoes from the body, and then converting the received echoes into echo signals;

amplifying the echo signals at an amplification factor;

forming a histogram on the basis of the echo signals, in which the histogram is formed by taking image brightness values of an abscissa as gradations and taking the numbers of pixels having the respective corresponding image brightness values on an ordinate as frequencies;

detecting a compared value from the formed histogram;

comparing the compared value of the formed histogram with a predetermined value of a reference histogram corresponding to the optimum image condition;

determining the echo signal amplification factor so as to eliminate the difference between the two values; and displaying an ultrasonic image under optimum image conditions on the basis of the echo signals amplified in accordance with the determined amplification factor.

28. The method of diagnosing a living body by ultrasonic waves of claim 27, wherein the compared value of the formed histogram is a brightness value at a gradation to which a median value of the formed histogram is located.

29. The method of diagnosing a living body by ultrasonic waves of claim 27, wherein the compared value of the formed histogram is a brightness value at a gradation at which a peak value of the formed histogram is located.

30. The method of diagnosing a living body by ultrasonic waves of claim 27, further comprises a step of adjusting image contrast level of the amplified echo signals, and wherein the index value of the formed histogram is a histogram width at a predetermined histogram height of the histogram, the ultrasonic image being displayed on the basis of the echo signals whose contrast level is adjusted at the determined contrast level amplification factor under the optimum contrast condition.

31. The method of diagnosing a living body by ultrasonic waves of claim 27, wherein the steps of amplifying the echo signals, producing histogram information, detecting an index value, comparing the detected index value with a reference index value, and determining the echo signal amplification factor are all implemented for each data extracted from a plurality of visual field depths in a tomographic ultrasonic image, respectively.

32. The method of diagnosing a living body by an ultrasonic wave of claim 27, which further comprises a step of smoothing the formed histogram.

33. The method of diagnosing a living body by ultrasonic waves of claim 27, wherein the steps of producing histogram information, detecting an index value, comparing the detected index value with a reference value, and determining the echo signal amplification factor are all executed in pipe-line processing.

34. An ultrasonic diagnostic apparatus, comprising:

an ultrasonic transducer for transmitting and receiving ultrasonic waves to and from a body to be examined; and control means for automatically determining an optimum image conditions by controlling an amplification factor of the echo signals in a feed-back manner on the bases of data obtained from the echo signals and predetermined reference data corresponding to the optimum image condition in such a way that the obtained data coincides with the predetermined reference data.

35. The ultrasonic diagnostic apparatus as claimed in claim 34, further comprising means for changing the reference data.

36. A method of diagnosing a living body by ultrasonic waves, comprising the steps of:

transmitting ultrasonic waves to a body to be examined and receiving echoes from the body, and then converting the received echoes into echo signals;

comparing data obtained from the echo signals and predetermined reference data corresponding to an optimum image condition;

controlling an image condition using feed-back in such a way that the obtained data coincides with the reference data; and displaying an ultrasonic image in accordance with the controlled image condition.

* * * * *